United States Patent [19]

Masaki et al.

[11] Patent Number: 5,621,825
[45] Date of Patent: Apr. 15, 1997

[54] IMAGE PROCESSOR, IMAGE PROCESSING METHOD AND APPARATUS APPLYING SAME

[75] Inventors: Toshimichi Masaki; Yutaka Kato, both of Kyoto, Japan

[73] Assignee: Omron Corporation, Japan

[21] Appl. No.: 146,022

[22] PCT Filed: Mar. 8, 1993

[86] PCT No.: PCT/JP93/00285

§ 371 Date: Nov. 5, 1993

§ 102(e) Date: Nov. 5, 1993

[87] PCT Pub. No.: WO93/18471

PCT Pub. Date: Sep. 16, 1993

[30] Foreign Application Priority Data

Mar. 6, 1992 [JP] Japan .................................. 4-084786

[51] Int. Cl.$^6$ ............................................ G06K 9/38
[52] U.S. Cl. ................................. 382/274; 358/455
[58] Field of Search ................................. 382/270, 273, 382/274; 358/455, 456, 457, 458, 461

[56] References Cited

U.S. PATENT DOCUMENTS

| | | | |
|---|---|---|---|
| 3,898,617 | 8/1975 | Kashioka | 382/48 |
| 4,581,762 | 4/1986 | Lapidus et al. | 382/22 |
| 4,709,274 | 11/1987 | Tanoika | 358/283 |
| 4,821,334 | 4/1989 | Ogino et al. | 382/270 |
| 5,150,428 | 9/1992 | Leone et al. | 382/270 |
| 5,260,810 | 11/1993 | Kanno et al. | 358/462 |
| 5,267,330 | 11/1993 | Masuda | 382/270 |
| 5,317,653 | 5/1994 | Eschbach et al. | 382/270 |

FOREIGN PATENT DOCUMENTS

| | | | |
|---|---|---|---|
| 367295 | 11/1989 | European Pat. Off. | G06F 15/70 |
| 62-281673 | 5/1988 | Japan . | |

*Primary Examiner*—Yon J. Couso
*Attorney, Agent, or Firm*—Dickstein Shapiro Morin & Oshinsky LLP

[57] ABSTRACT

Input image data representing the image of a subject imaged by a video camera is applied from an A/D converter circuit 11 to a dither-image generating circuit 13, in which the image data is binarized in accordance with the error diffusion method, whereby dither image data represented by one bit per pixel is obtained. A plurality of small areas each comprising a plurality of pixels are set within a window caused to scan the dither image, and the dither image data is summed in each and every small area by an image restoration circuit 14, whereby gray-level image data, in which each small area serves as one pixel, is restored. A difference or correlation value between the restored image data and text data set in advance with regard to a standard image is calculated, for the window at each and every position, by an arithmetic circuit 15. The smallest difference or the largest correlation value and the position of the window in which this smallest difference or the largest correlation value is produced are sensed by a peak holding circuit 16.

27 Claims, 24 Drawing Sheets

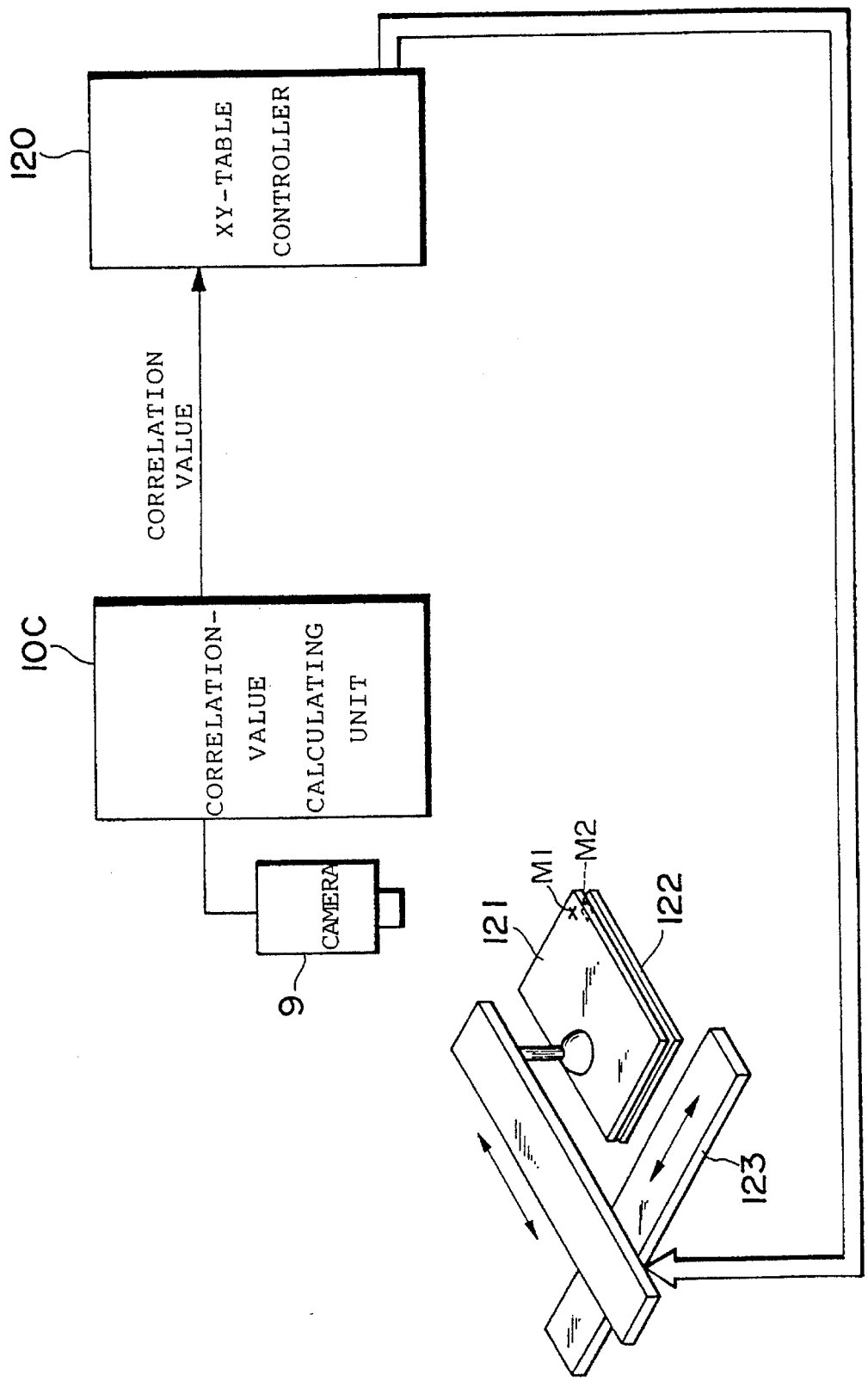

IMAGE PROCESSOR, IMAGE PROCESSING METHOD AND APPARATUS APPLYING SAME

TECHNICAL FIELD

This invention relates to an image processor and an image processing method for performing pattern-matching processing and the like for the purpose of object recognition, as well as to an apparatus which applies the same.

BACKGROUND ART

A technique available for pattern matching involves setting a window on image data obtained by imaging a subject, and calculating degree of coincidence or degree of similarity between partial image data within the window and standard image data registered in advance. By executing the above-described processing with regard to the window at each position thereof while the window is made to scan within a picture, a window containing partial image data exhibiting the highest degree of coincidence or similarity is detected, thereby making it possible to recognize a position at which an image identical or similar to the standard image exists. Thus, measurement processing of various types can be executed with regard to image data within a specified window.

Image data generally is represented by eight or more bits per pixel. Line memories are used in order to extract image data within a set window at a video rate. The line memories, the number of which corresponds to the number of pixels in the vertical direction of the window, are connected in cascade, and image data is transferred among the line memories in synchronism with a clock signal. By extracting image data at a single stroke from a prescribed position of each line memory, e.g., the terminus of the line memory, one column of image data in the vertical direction of the window is obtained.

In an image processor having such a configuration, a problem encountered is that a large number of line memories of at least eight bits each must be provided, as a result of which there is an increase in the scale of hardware. Further, pattern-matching processing of eight bits per pixel is required. When this is implemented by hardware, the scale of circuitry is similarly increased. If it is attempted to implement the foregoing by software, more complicated processing results.

DISCLOSURE OF THE INVENTION

A main object of the present invention is to provide an image processor and an image processing method through which hardware can be reduced in scale.

Another object of the present invention is to simplify pattern-matching processing.

A further object of the present invention is to provide various applications of the image processor.

An image processor according to the present invention comprises pseudo-gray-scale image generating circuit means for converting input image data, which is represented by a first prescribed number of bits per pixel, into pseudo-gray-scale image data represented by a second prescribed number of bits, which is less than the first prescribed number of bits, image restoration circuit means for restoring the pseudo-gray-scale image data for each and every one of a plurality of small areas, each of which comprises a plurality of pixels and is provided in a window that scans the pseudo-gray-scale image generated by the pseudo-gray-scale image generating circuit means, with each small area serving as one restored pixel, and outputting restored image data for a window at each and every position, and similarity operating circuit means for calculating an index value representing a degree of similarity between the restored image data of each window sequentially outputted by the image restoration circuit means and text data representing a standard image set in advance.

An image processing method according to the present invention comprises converting input image data, which is represented by a first prescribed number of bits per pixel, into pseudo-gray-scale image data represented by a second prescribed number of bits, which is less than the first prescribed number of bits, summing the pseudo-gray-scale image data for each and every one of a plurality of small areas, each of which comprises a plurality of pixels and is provided in a window that scans the pseudo-gray-scale image generated, thereby restoring the image data for a window at each and every position, with each small area serving as one restored pixel, and calculating an index value representing a degree of similarity between the restored image data of each window and text data representing a standard image set in advance.

In an embodiment of the image processor according to the present invention, the pseudo-gray-scale image generating circuit means binarizes the input image data using an error diffusion method and generates dither image data represented by one bit per pixel.

In another embodiment of the image processor according to the present invention, the pseudo-gray-scale image generating circuit means subjects the input image data to a four-value conversion using an error diffusion method and generates pseudo-gray-scale image data represented by two bits per pixel.

In accordance with the present invention, input image data is converted into pseudo-gray-scale image data, and the number of bits per pixel of the image data is reduced by a wide margin. As a result, it is possible to greatly reduce the number of bits of line memories used when pseudo-gray-scale image data within a window is extracted at a video rate. Accordingly, the scale of hardware circuitry can be reduced and cost can be lowered.

Further, gray-scale image data is restored by summing pseudo-gray-scale image data for each and every small area provided in a window. One pixel of restored image data is equal to the size of the small area. Accordingly, the number of pixels of restored image data is reduced so that processing (processing for calculating a similarity index value) for pattern matching with text data is simplified. This leads to smaller scale circuitry in the case of hardware and to simplification of processing in the case of software. Since the lightness distribution of the input image data is substantially preserved in the restored image data, the precision of pattern matching can be maintained.

The pseudo-gray-scale image data is represented by one, two or more bits per pixel, as mentioned above. Though lightness resolution is higher the larger the number of bits, the scale of circuitry is greater in such case. For practical reasons, therefore, the number of bits should be set determined appropriately. The size of the small areas has an effect upon spatial resolution and lightness resolution. The size of the small areas also should be determined based upon practical considerations.

Specifically, the image restoration circuit means comprises cascade-connected line memories, the number of which corresponds to the number of pixels in the vertical direction of the window, for transferring pseudo-gray-scale image data having the second prescribed number of bits, a circuit for extracting, from each of the line memories, and for each and every small area, pseudo-gray-scale image data of a number of pixels in the horizontal direction of the window, and adder circuit means for summing the extracted pseudo-gray-scale image data for each and every small area and outputting restored image data.

In a preferred embodiment, smoothing circuit means is further provided for smoothing the restored image data, which is outputted by the adder circuit means, over restored pixels before and behind the restored image data. As a result, the restorability of the image data is improved.

In an embodiment of the present invention, peak holding circuit means is further provided for detecting an index value, which represents the highest degree of similarity, from among similarity index values regarding each of the windows obtained from the similarity operating circuit means, and position data indicative of the window in which this index value is generated.

As a result, it is possible to detect the position of an image having the highest degree of similarity to the standard image.

In an embodiment of the present invention, the index value representing degree of similarity is a difference value in image lightness of the image, and the similarity operating circuit means calculates an absolute value of a difference between restored image data and corresponding text data for each and every small area, sums the absolute values of these differences over all small areas contained in one window and outputs the sum value as a difference value of lightness. Further, the peak holding circuit means is realized as means for detecting a smallest difference value from among the difference values of lightness regarding each of the windows obtained by the similarity operating circuit means, as well as position data indicative of the window in which the smallest difference value is produced.

In another embodiment of the present invention, the similarity operating circuit means calculates a cross-correlation value between restored image data and text data for each and every window, and outputs this cross-correlation value as the index value representing degree of similarity. In this case, the peak holding circuit means is realized as means for detecting a largest cross-correlation value from among the cross-correlation values regarding each of the windows obtained by the similarity operating circuit means, as well as position data indicative of the window in which the largest cross-correlation value is produced.

The present invention provides examples of applications of the image processor and image processing method described above.

One example of an application is an inspection apparatus for scratches, stains and the like. This apparatus comprises image sensing means for imaging a subject and outputting a video signal representing the image of the subject, an A/D converter circuit for converting the video signal, which is outputted by the image sensing means, into input image data, deviation value calculating means for calculating a deviation value regarding lightness, or density of a specific color, in the input image data outputted by the A/D converter circuit, and means for determining whether the deviation value obtained by the deviation value calculating means is greater than a predetermined threshold.

The above-mentioned deviation value is a variance or standard deviation.

In an embodiment of the inspection apparatus for contaminants or the like, there are further provided pseudo-gray-scale image generating circuit means for converting the input image data, which is represented by a first prescribed number of bits per pixel, into pseudo-gray-scale image data represented by a second prescribed number of bits, which is less than the first prescribed number of bits, and image restoration circuit means for restoring the pseudo-gray-scale image data for each and every one of a plurality of small areas, each of which comprises a plurality of pixels, provided in a window that scans the pseudo-gray-scale image generated by the pseudo-gray-scale image generating circuit means, with each small area serving as one restored pixel, and outputting restored image data for a window at each and every position. The deviation value calculating means calculates a deviation value for each and every window with regard to the restored image data, and detects a maximum value from among these deviation values. The determining means compares the maximum deviation value with a predetermined threshold value.

In this inspection apparatus for scratches or the like, use is made of the fact that when the surface of an object is scratched or soiled, there is an increase in the deviation value regarding the lightness or the density of a specific color in the resulting image data. Accordingly, the presence of scratches or stains can be sensed correctly even if the surface of the object has a fine, uniform pattern, and sensing is not influenced by an irregularity in lightness or by shading.

Another example of an application of the image processor and image processing method according to the present invention is a positioning apparatus. The positioning apparatus can be utilized in the positioning of a mask in a semiconductor manufacturing process or in the positioning of two transparent plates in a liquid-crystal device.

The positioning apparatus comprises means for freely movably holding one of two subjects that are to be positioned, each subject having a positioning mark represented thereon, image sensing means for imaging the two positioning marks and outputting image data representing the images, similarity operating means for calculating degree of similarity between the image data outputted by the image sensing means and standard image data representing a standard mark pattern on which the two positioning marks are formed when correctly positioned, and means for driving the holding means, in dependence upon the degree of similarity calculated by the similarity operating means, in such a manner that the one subject is moved in a direction in which the degree of similarity will rise.

It is possible to perform feedback control for positioning at the period at which subjects are imaged. This makes high-speed positioning possible.

Another example of application is an automatic tracking system. The automatic tracking system comprises image sensing means for imaging a subject and outputting image data representing the subject, means for storing standard-image data representing a partial image within a window, which contains an image of the subject, in an initial image obtained from the image sensing means by imaging the subject in an initial state, as well as the position of this window, similarity operating means for calculating degree of similarity between image data in the window and the standard-image data for each and every position of the window that scans the image obtained from the image sensing means, means for detecting the position of a window in which is produced the highest degree of similarity among the degrees of similarity obtained from the similarity operating means, and driving means for driving the image sensing means, in dependence upon a deviation between the position of the window stored in the storing means and the position of the window detected by the detecting means, in a direction in which this deviation will be reduced.

In this automatic tracking system also it is possible to perform feedback processing for displaying the image sensing means at the period at which subjects are imaged. This makes smooth tracking possible.

Preferably, the apparatus is provided with means for updating the standard-image data using the image data representing the partial image in the window in which the highest degree of similarity is produced.

By displacing or moving the subject, the standard-image data is updated at all times even if the image gradually changes. As a result, the invention is applicable also to tracking of such subject.

BRIEF DESCRIPTION OF THE DRAWINGS

FIGS. 21a and 21b illustrate examples of lightness distributions along a horizontal scanning line of image data, in which FIG. 21a shows a case in which there is no shading or irregularity in lightness and FIG. 21b shows a case in which there is shading or irregularity in lightness;

FIGS. 23a and 23b show lightness histograms, in which FIG. 23a shows a case in which there is no scratch or stain and FIG. 23b shows a case in which is a scratch or stain;

FIG. 24 illustrates the overall configuration of a positioning apparatus, which is a second application;

BEST MODE FOR CARRYING OUT THE INVENTION

First Embodiment

Figure 1:
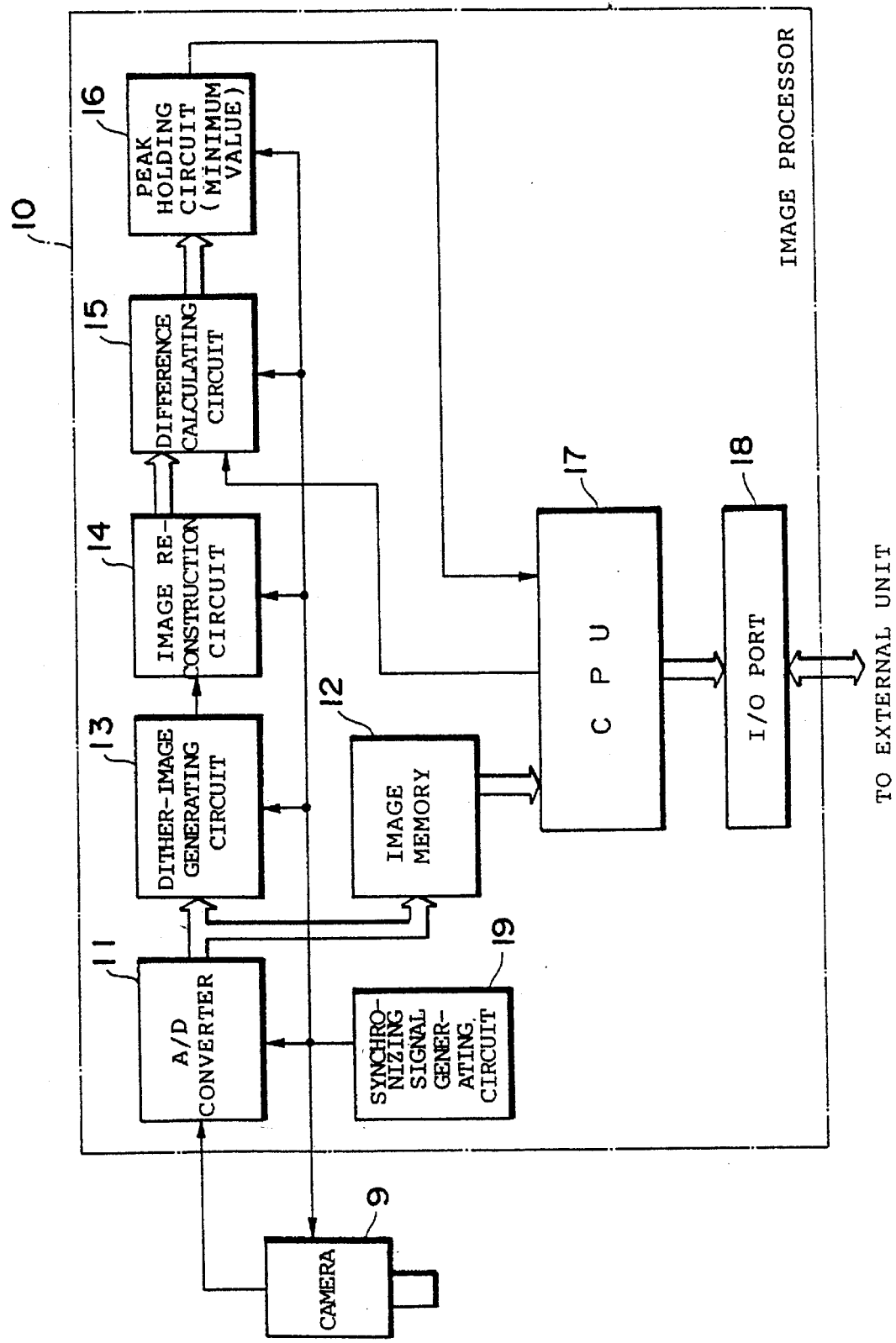
FIG. 1 is a block diagram illustrating the overall configuration of an image processor according to a first embodiment.

FIG. 1 is a block diagram illustrating the overall configuration of an image processor according to a first embodiment.

An image processor 10 includes an A/D converter 11, an image memory 12, a dither-image generating circuit 13, an image restoration circuit 14, a difference calculating circuit 15, a peak holding circuit 16, a CPU 17 and an I/O port 18.

Figure 2:
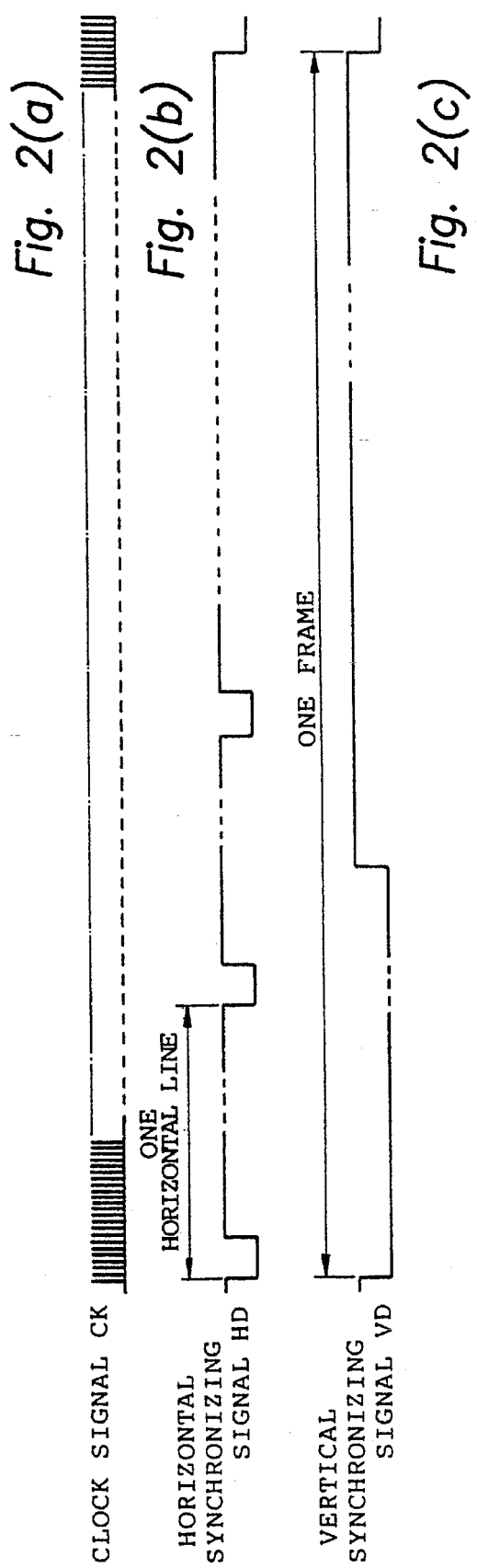
FIG. 2 is a waveform diagram showing a clock signal, a horizontal synchronizing signal and a vertical synchronizing signal.

A synchronizing signal generating circuit 19 of the image processor 10 generates a clock signal CK, a horizontal synchronizing signal HD and a vertical synchronizing signal VD (these signals shall be referred to collectively as "synchronizing signals") of the kind shown in FIG. 2. The synchronizing signals are applied to a video camera 9, the A/D converter 11, the dither-image generating circuit 13, the image restoration circuit 14, the difference calculating circuit 15 and the peak holding circuit 16. The clock signal CK, one pulse of which is outputted per pixel of image data, serves as a sampling clock signal.

The video camera or television camera 9 picks up the image of a subject and outputs an analog video signal, which represents the image of the subject, in synchronism with the applied synchronizing signals. The analog video signal is applied to the A/D converter 11 of the image processor 10.

The A/D converter 11 converts the entering analog video signal into digital image data. In this embodiment, the digital image data is represented by eight bits. That is, a gray-scale image of 256 levels is expressed by this image data. The digital image data is applied to and stored in the image memory 12 and is also fed into the dither-image generating circuit 13.

The dither-image generating circuit 13 quantizes the entering eight-bit digital image data using the error diffusion method and obtains binary image (dither image) data of the type perceived as a tone when viewed overall. The dither image data is applied to the image restoration circuit 14.

In the image processor 10 of this embodiment, the degree of similarity between a partial image, which is extracted from the input image (the image picked up by the camera 9) while successively changing position, and a specific partial image of a given standard image (model image) is calculated, and the position, in the input image, of the partial image having the highest degree of similarity is determined. In this embodiment, a difference in lightness or a difference in density (these shall be referred to as "differences") is used as an index of similarity.

Figure 3:
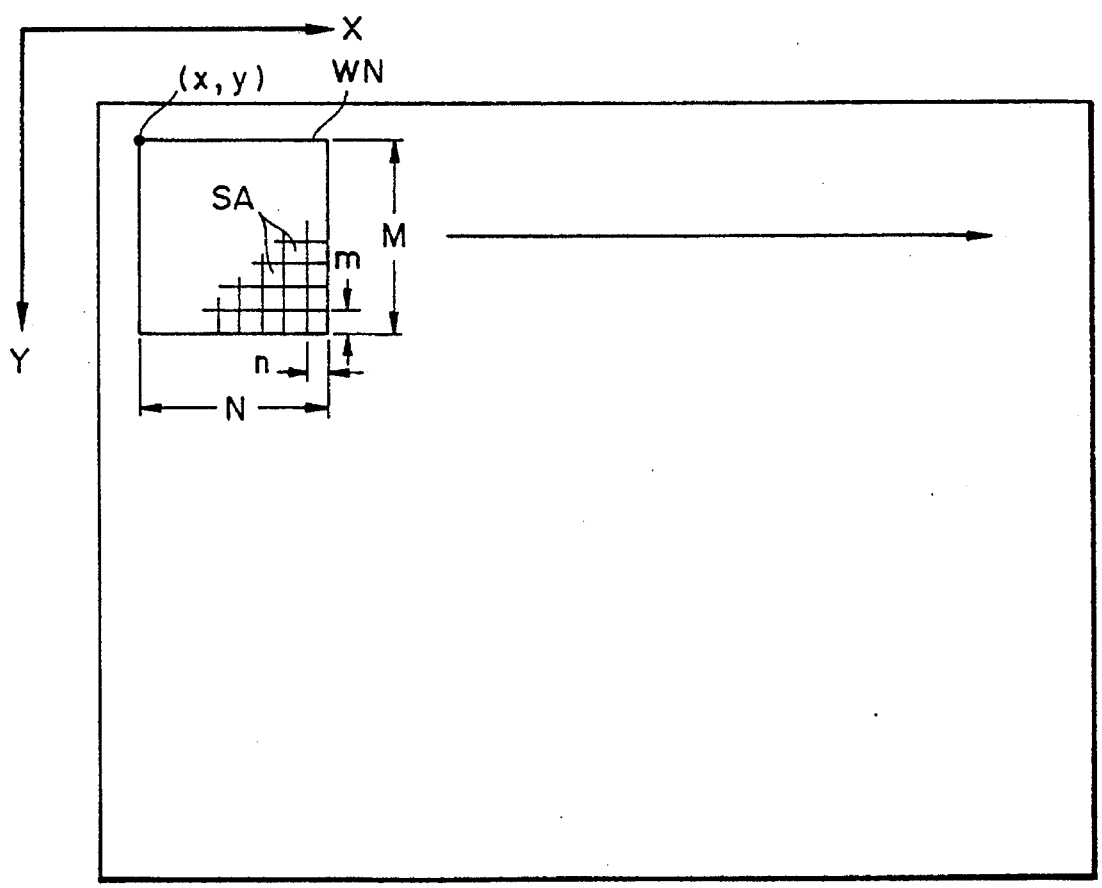
FIG. 3 illustrates a window set within a picture as well as a small area set within the window.

In order to clip a partial image from the input image, a square window WN is used, as shown in FIG. 3. Let the size of the window WN be N×M pixels (one pixel corresponds to the clock signal CK). The X and Y axes are taken respectively in the horizontal and vertical directions of the image. The position of the window WN is represented by the coordinates x, y of the point in the upper left-hand corner of the window.

Furthermore, in order to convert the dither image back into a gray-scale image, a plurality of square small areas SA that become one picture element of a restored gray-scale image are provided within the window WN. Let the size of each small area SA be n×m pixels (one pixel corresponds to the clock signal CK). This means that the window WN is partitioned into (N/n)×(M/m) small areas. It should be noted that a portion (spacing) that does not belong to any small area may be provided between mutually adjacent small areas.

By way of example, the window WN is set to 64 pixels (dots)×64 pixels (dots), and each small area SA is set to 4 pixels (dots)×4 pixels (dots). The window WN is partitioned into 16×16=256 small areas SA.

With reference again to FIG. 1, the image restoration circuit 14 generates reconstructed gray-scale image data by summing the dither image data (1 or 0) in each small area SA of the window WN. The size of one pixel of this restored gray-scale image data is equal to the size of the small area SA and possesses a lightness (density) resolution of n×m levels of gray (e.g., if n=m=4 holds, there will be 16 levels of gray).

The restored gray-scale image data is applied to the difference calculating circuit 15. The CPU 17 supplies the difference calculating circuit 15 with text data, which corresponds to the aforementioned restored gray-level image data, created beforehand with regard to the specific partial image of the standard image. The text data is created beforehand with regard to the specific partial image of the standard image by a technique exactly the same as that of processing for creating restored gray-level image data regarding the input image. For example, the standard image is picked up by the camera 9, the video signal obtained is converted into digital image data by the A/D converter 11, dither image data is created by the dither-image generating circuit 13 with the digital image data serving as the input, a specific portion in the dither image data is cut out through a window, the window is subdivided into a plurality of small areas and the dither image data is summed for each and every small area, thereby creating text data. Of course, the text data may be created by another apparatus, applied to the CPU 17 through the I/O port 18 and then stored in a memory peripheral to the CPU 17.

The difference calculating circuit 15 calculates the difference between the restored gray-level image data and the text data for each and every small area and sums the absolute values of these differences with regard to all of the small areas within the window. The smaller the sum value, the greater the similarity between the partial image cut from the input image by the window and the specific partial image of the standard image. This is one type of pattern-matching processing.

As set forth above, the window WN is scanned across the entire area of the input image in the horizontal and vertical directions. The peak holding circuit 16 find the window in which the sum of the absolute values of the aforementioned differences takes on the minimum value. The minimum value of the sum and the coordinates of the position of the window in which the minimum value was obtained are applied to the CPU 17 from the peak holding circuit 16.

The CPU 17 executes predetermined processing based upon the minimum value and the coordinates of the window position provided by the peak holding circuit 16. For example, the CPU compares the applied minimum value with a predetermined threshold value and, if the minimum value is equal to or less than the threshold value, judges that the partial image cut from the input image by this window coincides with the specific partial image of the standard image. When it is judged that coincidence has been attained, the CPU uses the applied coordinates of the window to read the image data of the partial image for which coincidence has been judged out of the image memory 12, and applies this image data to an external device, e.g., a CRT display unit, through the I/O port 18 to present a display of the partial image. If necessary, the partial image for which coincidence has been judged is subjected to measurement processing (e.g., processing for tracing the contour, for calculating the area or position of the center of gravity of a portion defined by the contour or for recognizing shape).

In the description given above, the expression "a specific partial image of a standard image" is used as the counterpart to a partial image cut from the input image by a window. However, this specific partial image may be expressed as a "standard image" or standard pattern.

Specific examples of the construction of the circuit blocks shown in FIG. 1 will now be described in succession.

Figure 4:
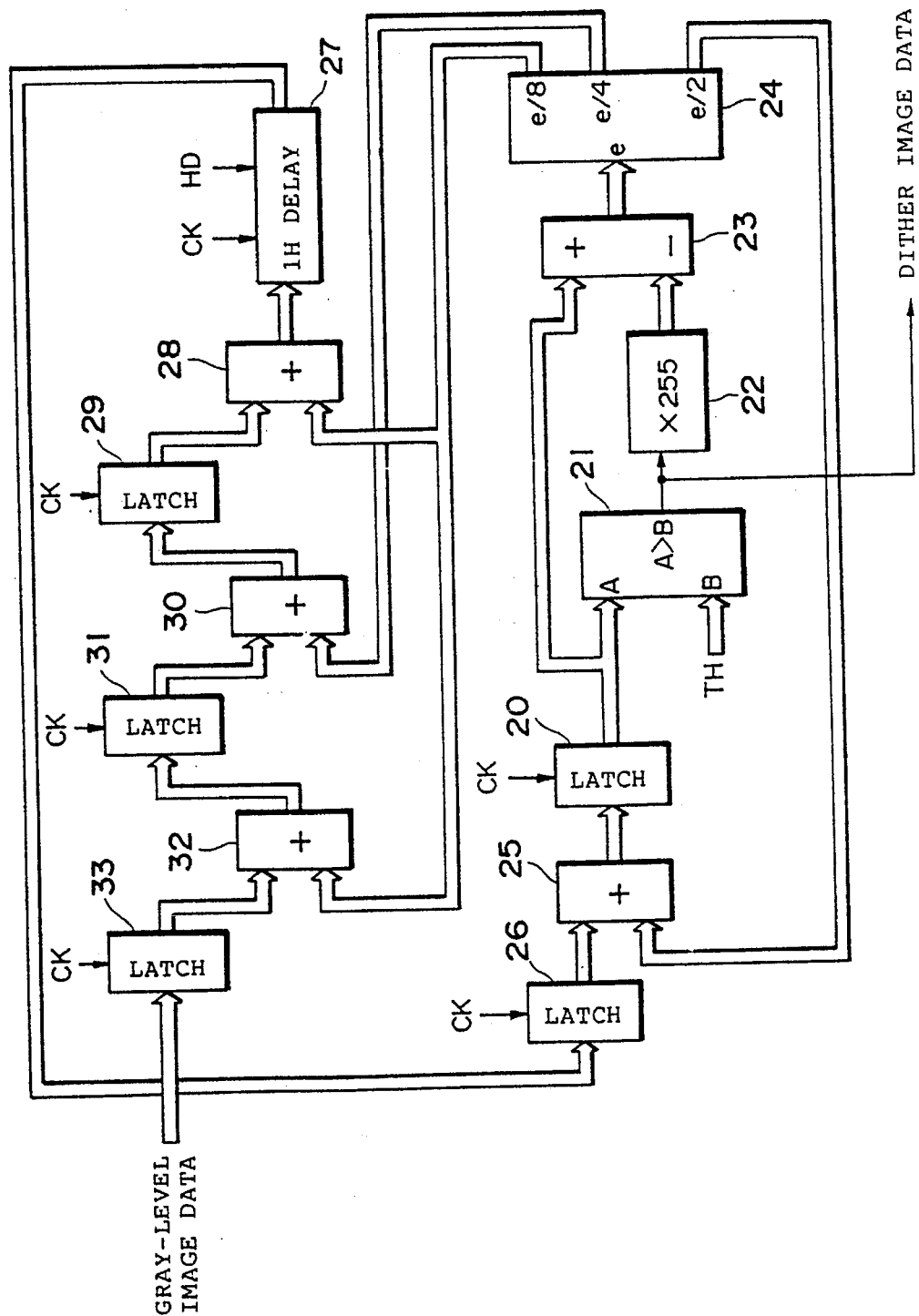
FIG. 4 is a block diagram illustrating a specific example of a dither-image generating circuit.

FIG. 4 illustrates a specific example of the construction of the dither-image generating circuit 13. Further, FIG. 5 and FIGS. 6a, 6b are for describing the principles of binarization by the error diffusion method.

Figure 5:
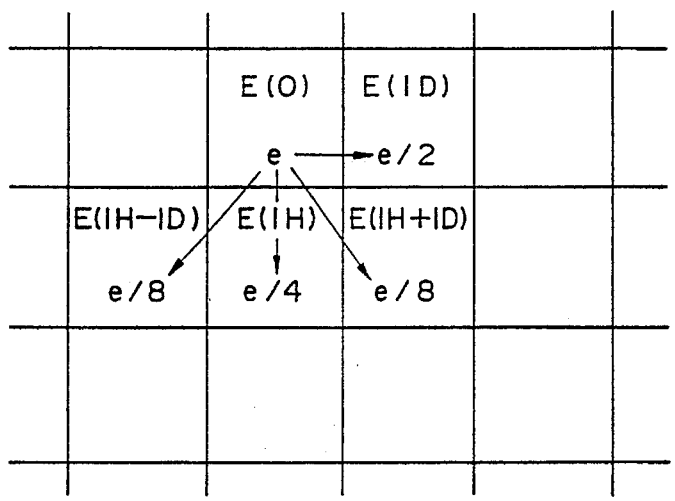
FIG. 5 and FIGS. 6a, 6b illustrate the principles of binarizing processing that employs the error diffusion method.
Figure 6A:
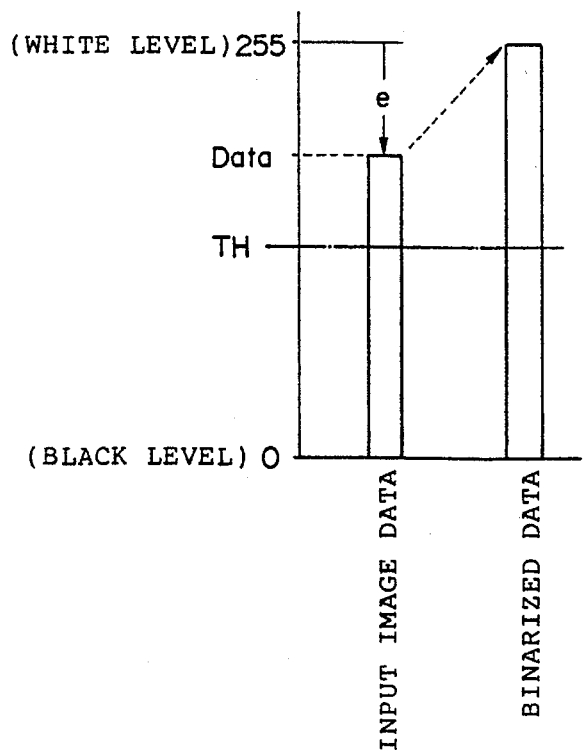
Figure 6B:
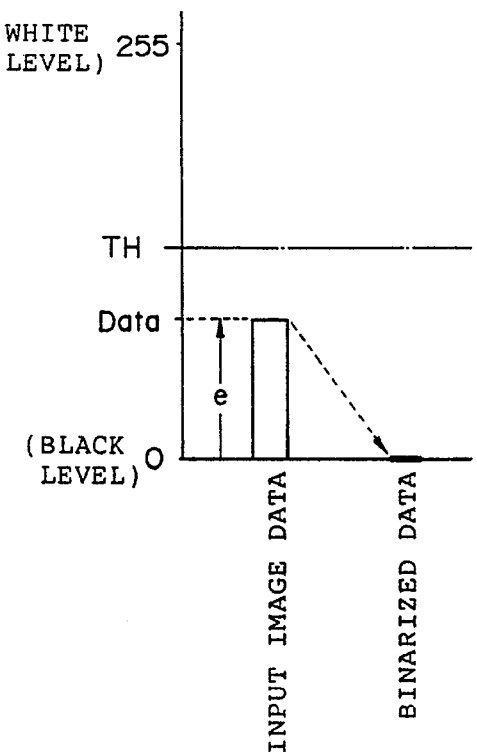

In FIG. 5, the description will focus on one pixel E(0) of an input image. The A/D conversion performed by the A/D converter 11 is carried out at a period of one clock for every item of image data (eight bits) of one pixel, and the image data is fed, one pixel at a time in the order of scanning, into the dither-image generating circuit 13 at the period of the clock signal. Let E(1D) represent a pixel which is inputted 1D later than the pixel E(0) of interest (where 1D is one period of the clock signal CK). Similarly, let E(1H) represent a pixel at a position delayed by 1H relative to the pixel E(0) of interest (where 1H is one horizontal scanning interval), let E(1H−1D) represent a pixel at a position delayed by (1H−1D) relative to E(0), and let E(1H+1D) represent a pixel at a position delayed by (1H+1D) relative to E(0).

In accordance with the error diffusion method, first an error e at the pixel E(0) of interest is calculated. In accordance with the dither method, image data Data of the pixel E(0) of interest is compared with a predetermined threshold value TH. The threshold value TH usually is set midway between the white level (Data=255) and the black level (Data=0). If Data exceeds the threshold value TH, then the pixel E(0) of interest is binarized (binary data 1) by being forcibly set to the white level, as shown in FIG. 6a, and the error e produced in this binarization is calculated in accordance with the following equation:

$$e = \text{Data} - 255 \qquad \text{Eq. (1)}$$

It Data is equal to or less than the threshold value TH, then the pixel E(0) of interest is binarized (binary data 0) by being forcibly set to the black level, as shown in FIG. 6b, and the error e produced in this binarization is calculated in accordance with the following equation:

$$e = \text{Data} - 0 \qquad \text{Eq. (2)}$$

The binary data obtained by this binarizing processing is dither image data. Accordingly, the dither image data is expressed by one bit per pixel.

The error e produced by binarizing processing is apportioned to the other pixels E(1D), E(1H−1D), E(1H) and E(1H+1D) at a rate of e/2, e/8, e/4 and e/8. This is the error diffusion method. Thus, even though the image data of the pixel of interest is quantized, the error attendant upon this quantization is apportioned to the pixels adjacent to the pixel of interest. As a result, the average lightness (density) in the local area centered upon the pixel of interest is substantially preserved.

In FIG. 4, latch circuits 20, 26, 29, 31 and 33, each of which is composed of eight flip-flops, temporarily store eight-bit image data and act to apply a delay of 1D. The latch circuits 20, 26, 29, 31 and 33 are provided with the clock signal CK. A 1H delay circuit 27, which delays the image data by an interval of 1H, is provided with the clock signal CK and the horizontal synchronizing signal HD.

A situation will be considered in which the image data of the pixel E(0) of interest has been stored in the latch circuit 20. The image data Data of the pixel E(0) of interest is applied to one input terminal A of a comparator circuit 21. Data representing the threshold value TH is applied to the other input terminal B of the comparator circuit 21. The comparator circuit 21 outputs the binary data 1 if the input image data Data exceeds the threshold value TH (i.e., if A>B holds) and the binary data 0 in all other cases. This binary data is outputted as dither image data and also enters a multiplier circuit 22.

The multiplier circuit 22 multiplies the input binary data by 255. Accordingly, eight-bit data representing 255 is outputted by the multiplier circuit 22 if the input binary data is 1 and eight-bit data representing 0 is outputted if the input binary data is 0. The outputted data is applied to the negative input terminal of a subtractor circuit 23.

The image data Data of the pixel of interest held in the latch circuit 20 enters the positive input terminal of the subtractor circuit 23. Accordingly, the subtractor circuit 23 performs the operation represented by Equation (1) or Equation (2) and calculates the error e. The data representing the error e obtained is applied to a divider circuit 24.

The divider circuit 24 divides the error e by 2, 4 and 8 to calculate e/2, e/4 and e/8. Data representing the results of division e/2 is applied to an adder circuit 25, data representing e/4 is applied to an adder circuit 30, and data representing e/8 is applied to adder circuits 28, 32.

The image data of pixel E(1D) is held in the latch circuit 26. This image data is fed into the adder circuit 25. Accordingly, the data representing e/2 is added to the image data of pixel E(1D) in the adder circuit 25.

The image data of the pixels E(1H−1D), E(1H), E(1H+1D) is temporarily stored in the latch circuits 29, 31, 33, respectively. The image data enters the adder circuits 28, 30, 32, respectively. Accordingly, the data representing e/8, e/4 and e/8 is added to the image data of the pixels E(1H−1D), E(1H), E(1H+1D) in the adder circuits 28, 30, 32, respectively.

The various arithmetic operations described above are performed during one period of the clock signal CK, and the results of addition in the adder circuits 25, 28, 30, 32 are accepted by and temporarily stored in the succeeding circuits, namely the latch circuit 20, 1H delay circuit 27 and latch circuits 29, 31, respectively, at the timing of the next clock signal CK. The image data of the pixel E(1H+2D) is accepted by the latch 33.

The foregoing operation is executed every period of the clock signal CK. That is, binarization of the image data and diffusion of the error, which is produced attendant upon binorization, to the adjacent pixels, namely dither processing, are executed pixel by pixel.

Figure 7:
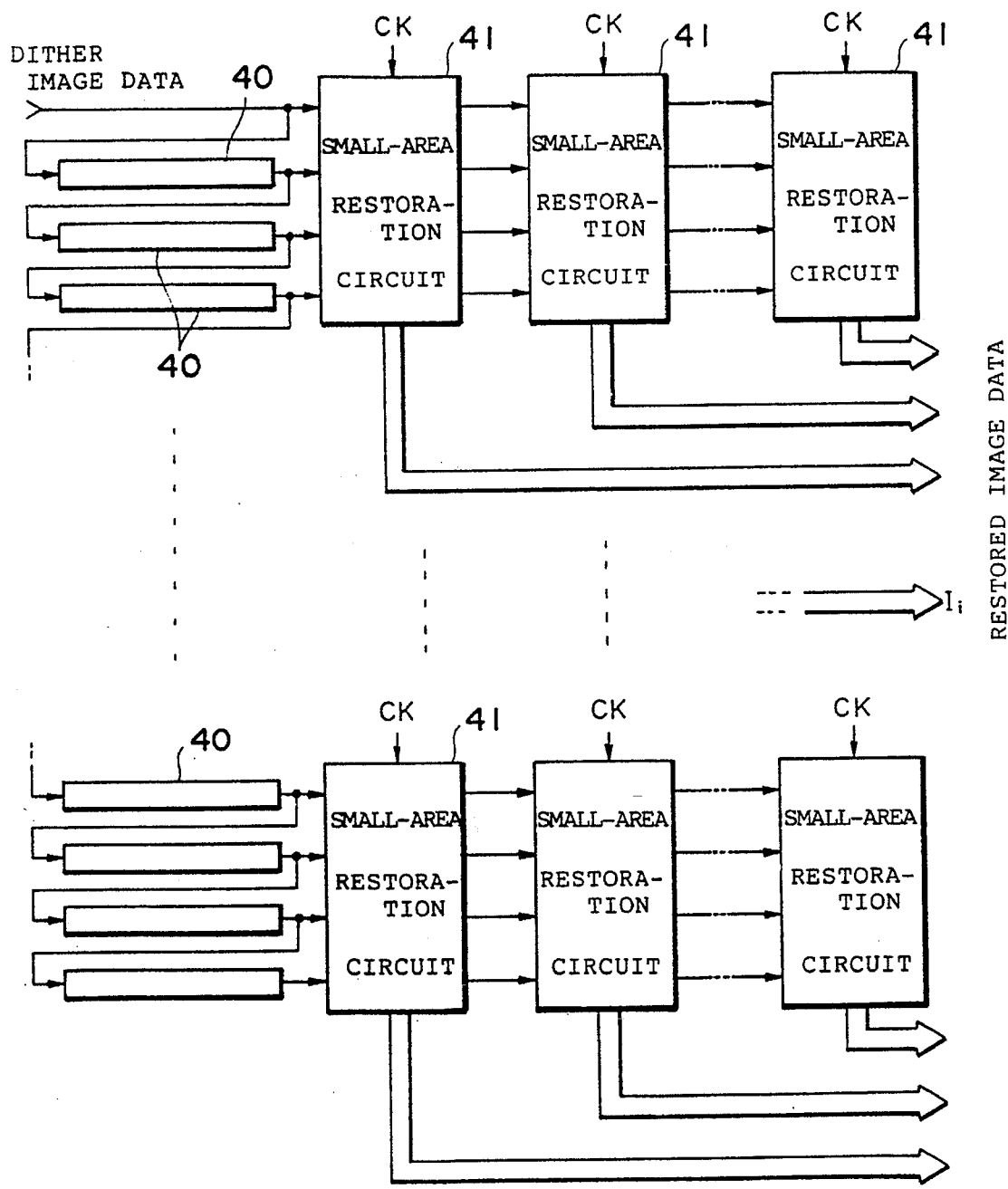
FIG. 7 is a block diagram illustrating a specific example of an image restoration circuit.
Figure 8:
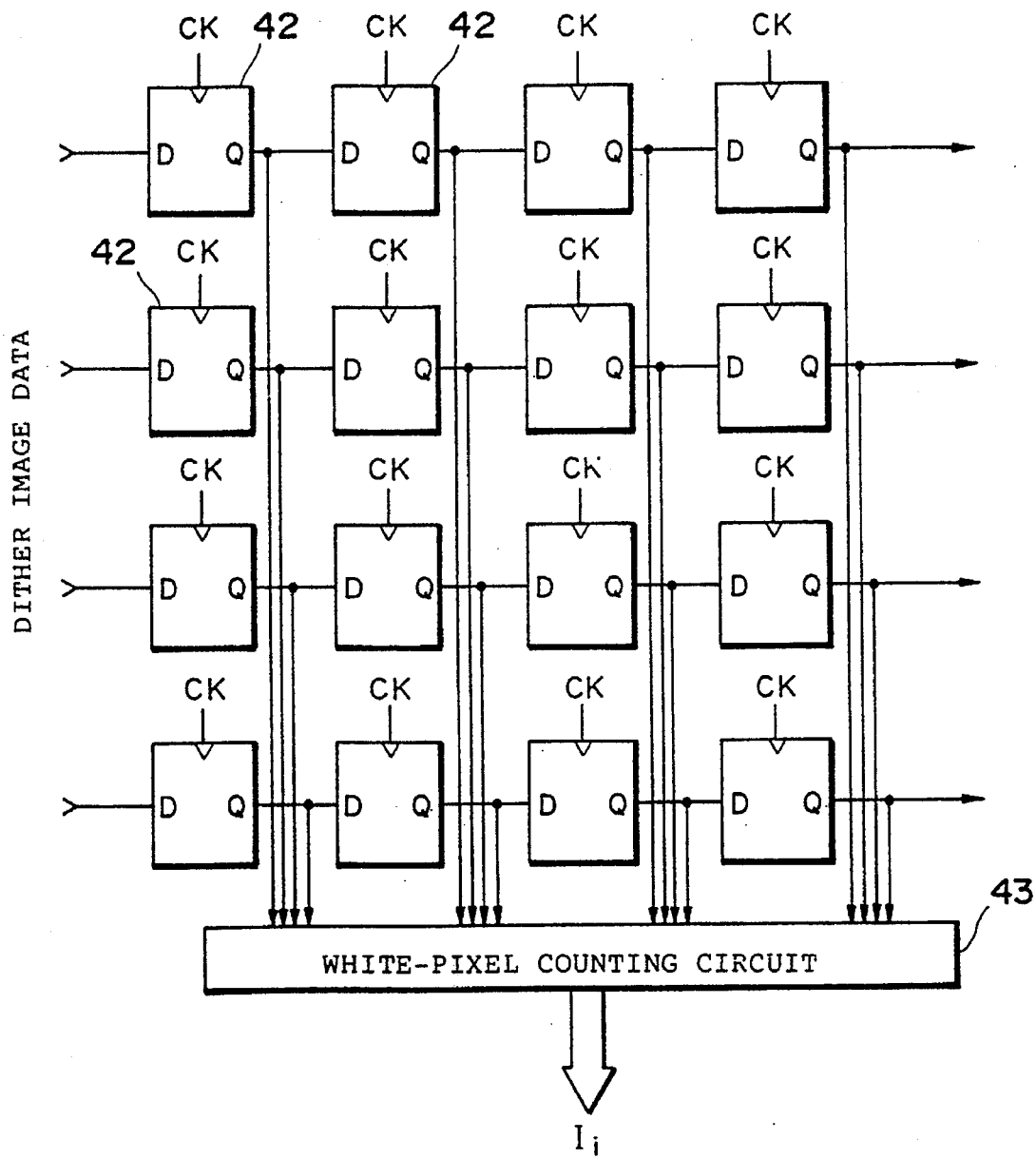
FIG. 8 is a block diagram illustrating a specific example of a small-area restoration circuit.

FIG. 7 illustrates the overall configuration of the image restoration circuit 14, and FIG. 8 illustrates a specific example of the construction of a small-area restoration circuit 41 shown in FIG. 7.

As mentioned above, the window WN is set in the input image and the window WN is scanned in the horizontal and vertical directions. The window WN is subdivided into the plurality of small areas SA.

The size (n×m) of each small area SA is decided by the number of flip-flops 42 contained in one small-area restoration circuit 41. In this embodiment, the size of each small area SA is 4×4 pixels, as shown in FIG. 8. The size (number of bits N) of the window WN in the horizontal direction is decided by the size (number of bits n) of the small-area restoration circuit 41 in the horizontal direction and the number of stages (N/n=16 stages in this embodiment) of the small-area restoration circuits 41 in the horizontal direction. The size (number of bits M) of the window WN in the vertical direction is decided by the size (number of bits m) of the small-area restoration circuit 41 in the vertical direction and the number of stages (M/m=16 stages in this embodiment) of the small-area restoration circuits 41 in the vertical direction.

In FIG. 7, the image restoration circuit 14 is provided with (N/n)×(M/m) small-area restoration circuits 41. The small-area restoration circuits 41 arrayed in the horizontal direction are connected in cascade. Further, (M−1)-number of one-bit line memories (one-bit shift registers) 40 are provided, and the line memories 40 also are connected in cascade. Further, the output of each line memory 40 enters the first column of corresponding small-area restoration circuits 41 arrayed in the vertical direction. That is, the output dither image data of the dither-image generating circuit 13 and the output data of the line memories 40 of the first through third stages are applied to the small-area restoration circuit 41 in the first column and first row. Similarly, the output data from four line memories 40 at a time is applied to those small-area restoration circuits of the first column that correspond thereto.

With reference to FIG. 8, each small-area restoration circuit 41 includes n×m flip-flops 42 arrayed in m rows and n columns. The flip-flops 42 in the same row (lined up in the horizontal direction) are connected in cascade. Inputted to the flop-flop 42 in each row of the leading column is the output data of a line memory 40 (the output data of the dither-image generating circuit 13 is inputted to the flip-flop 42 in the first row and first column of the small-area restoration circuit 41 in the first row and first column) or the output data of the small-area restoration circuit 41 of the immediately preceding stage. The output data from the flip-flop 42 in each row of the last column is applied to a flip-flop 42 in the leading column of the succeeding small-area restoration circuit 41 (this is unnecessary if there is no small-area restoration circuit connected to the succeeding stage).

The output data (one-bit data) of each flip-flop 42 is applied to a white-pixel counting circuit 43. The latter counts the number of pixels possessing the white level (binary data 1) contained in the small area SA. Since the small area SA is composed of 4×4 pixels in this embodiment, the maximum value of the count is 16 and the output data of the counting circuit 43 is capable of being expressed by a minimum of five bits (expression by eight bits is of course permissible). Output data $I_i$ from the counting circuit 43 becomes the output data of the small-area restoration circuit 41.

The output data $I_i$ of the small-area restoration circuit 41 is the result of expressing the average lightness of the small area SA in the form of 16 levels. This is restored gray-level image data. When the small area SA is considered to be one picture element, this restored gray-level image data may be said to express the lightness in this element.

If the size of each small area SA is enlarged, the resolution (number of levels) of lightness will increase but the spatial (two-dimensional) resolution of the subject will decrease. Accordingly, the size of each small area SA should be decided upon taking into account the lightness resolution and spatial resolution required.

By contrast, the window WN would be set in conformity with the size of the subject to undergo image processing. For example, if the purpose of processing is to recognize the position of a circle contained by a subject, the window WN is set to a size that contains the entirety of the circle (or a part thereof depending upon the case).

The clock signal CK is applied to the line memories 40 and to the flip-flops 42 of the small-area restoration circuits 41 in the above-described image restoration circuit 14. The data that has accumulated in these is shifted sequentially every period of the clock signal CK. As a result, the window WN is scanned in the horizontal and vertical directions. At each position of the window WN, the restored gray-level image data is obtained with regard to all of the small areas SA contained in the window WN.

Figure 9:
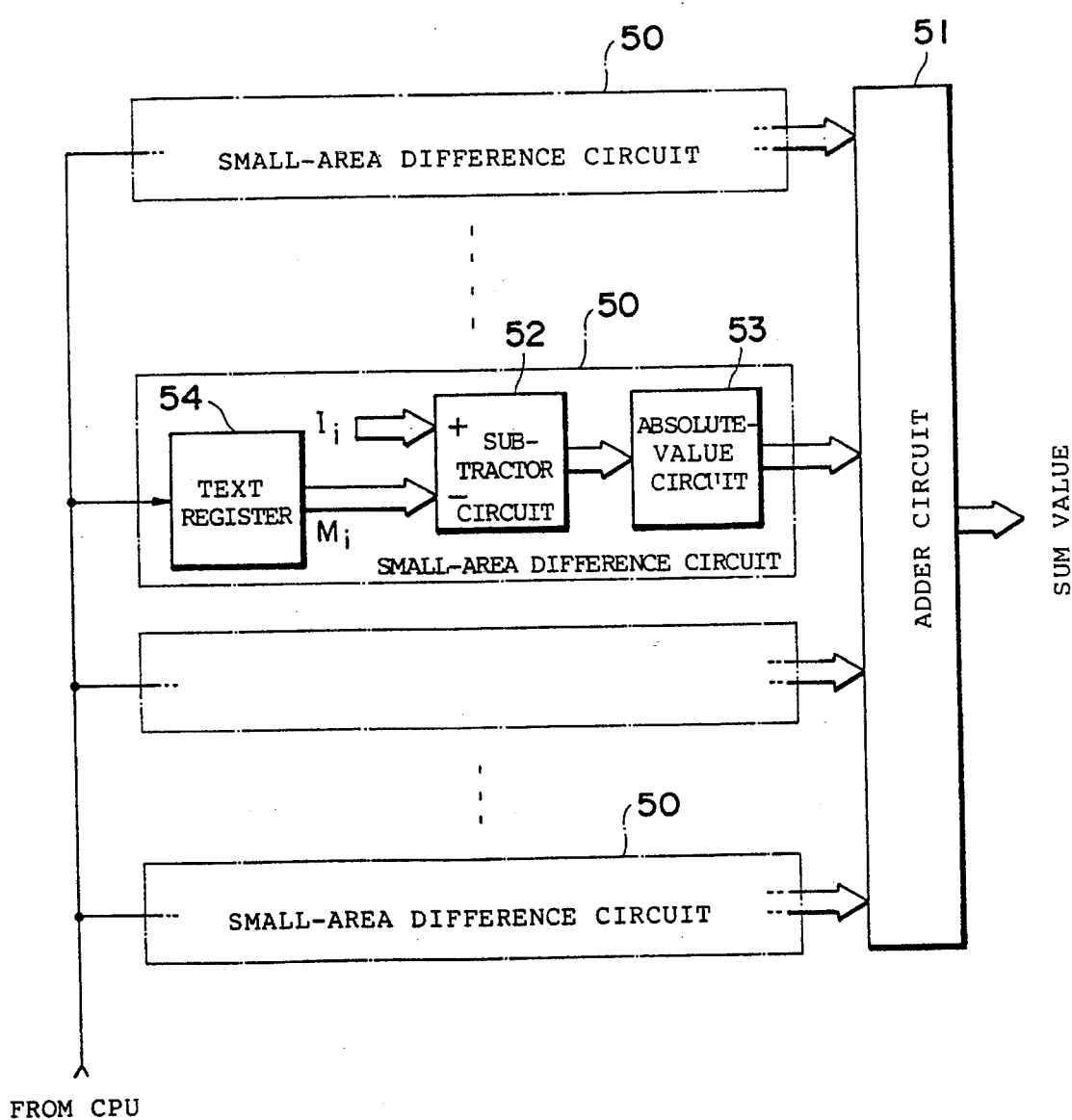
FIG. 9 is a block diagram illustrating a specific example of a difference calculating circuit.

FIG. 9 illustrates a specific example of the construction of the difference calculating circuit 15.

The difference calculating circuit 15 includes small-area difference circuits 50 the number of which is the same as that of the small-area restoration circuits 41. Each small-area difference circuit 50 is constituted by a subtractor circuit 52, an absolute-value circuit 53 and a text register 54. The output image data $I_i$ [i=1~(N/n)×(M/m)] of each small-area restoration circuit 41 is applied to the positive input terminal of the subtractor circuit 52 of the corresponding small-area difference circuit 50.

Meanwhile, as set forth above, text data $M_i$, which corresponds to the aforementioned restored gray-level image data $I_i$, and which is created in advance with regard to the specific partial image of the standard image, is stored in the text register 54 of each small-area difference circuit 50 upon being provided by the CPU 17. The text data $M_i$ of each text register is applied to the negative input terminal of the subtractor circuit 52.

The text data $M_i$ is gray-level image data of a small area obtained by performing processing in accordance with a technique exactly the same as that used for the image data $I_i$ with regard to the specific partial image of the standard image. In the illustrated example, the image data $M_i$ is applied serially to each text register 54 from the CPU 17. However, it is of course permissible to apply this data as parallel data through a data bus.

In the subtractor circuit 52, the text data $M_i$ is subtracted from the restored gray-level image data $I_i$, and the absolute value of the resulting difference is obtained in the absolute value circuit 53. The data representing the absolute value of the difference enters the adder circuit 51.

The adder circuit 51 sums the absolute-value data outputted by all of the small-area difference circuits 50. The value of the sum is applied to the peak holding circuit 16, which is the next stage. The value of the sum outputted by the adder circuit 51 represents the degree of similarity between the partial image within the window and the specific partial image in the standard image. The smaller the value of the sum, the greater the similarity between the two partial images.

Figure 10:
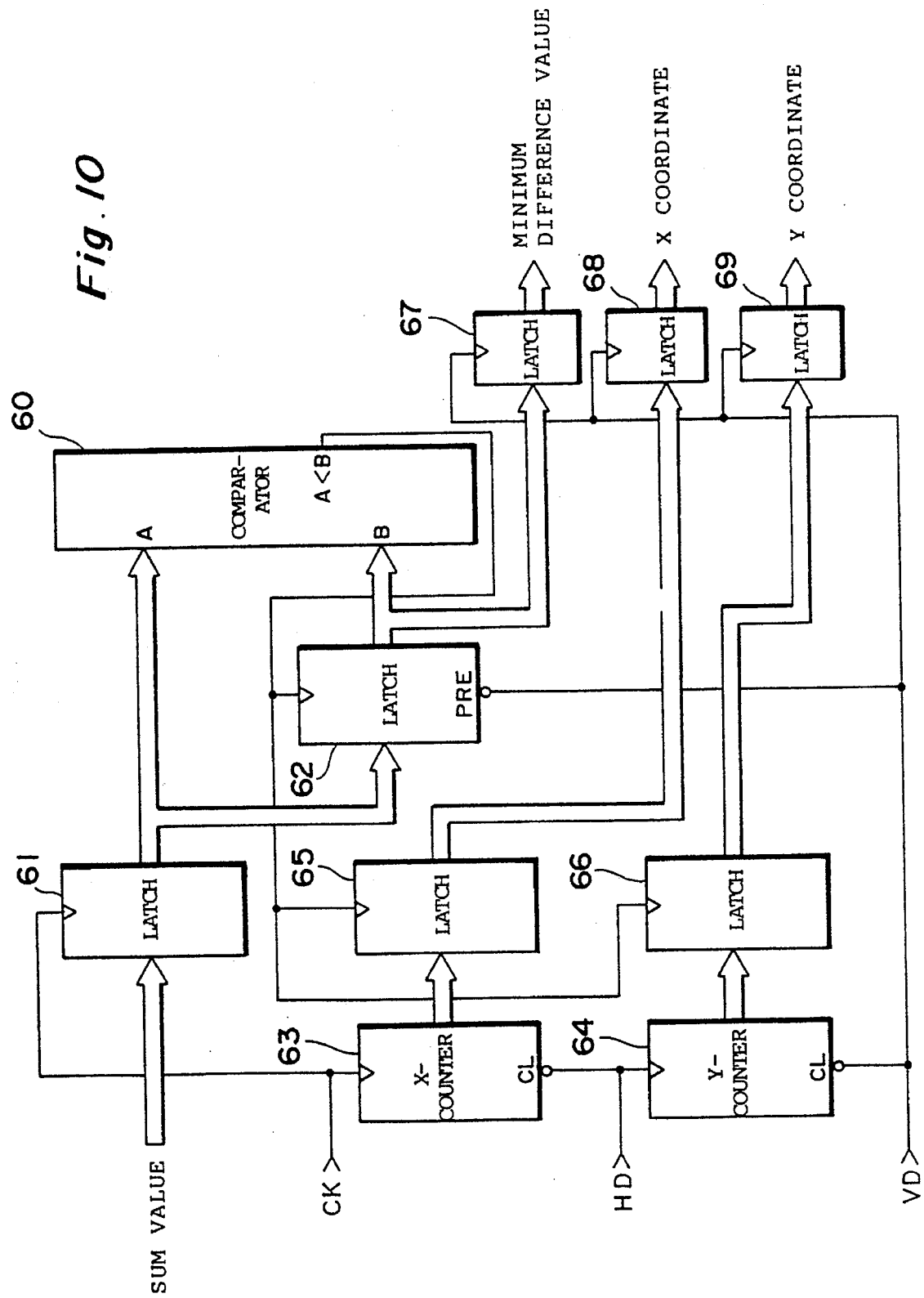
FIG. 10 is a block diagram illustrating a specific example of a peak holding circuit.

FIG. 10 illustrates a specific example of the construction of the peak holding circuit 16. The peak holding circuit 16 detects the minimum value of the sum (the minimum difference value) provided by the difference calculating circuit 15 and detects the coordinates representing the position of the window WN in which the minimum difference value is produced.

The minimum value of the sum inputted every period of the clock signal CK is detected by latch circuits 61, 62 and a comparator circuit 60. The maximum value possible (all 1s, for example) is preset in the latch circuit 62 at the timing at which the vertical synchronizing signal VD is applied at the start of peak holding processing. The sum provided by the difference calculating circuit 15 is temporarily stored in the latch circuit 61 every clock signal CK. The comparator circuit 60 compares the value of the sum being held in the latch circuit 61 and the value being held in the latch 62 (initially the maximum value, as mentioned above; from the first comparison operation onward, the value is the minimum value of the sum prevailing up to the current time). If the value of the sum being held in the latch 61 is smaller, the comparator circuit 60 generates an output signal. The output signal of the comparator is applied to the latch circuit 62 as a latch timing signal, and the value of the sum being held in the latch circuit 61 at this time is latched in the latch circuit 62 as the minimum value up to the current time. Thus, among the entered sum values, the minimum sum value up to the current time is held in the latch circuit 62.

Meanwhile, an X counter 63 is cleared by the horizontal synchronizing signal HD and then counts the clock signal CK input thereto from this point in time onward. Accordingly, the count in the X counter 63 represents the X coordinate of the window WN. A Y counter 64 is cleared by the vertical synchronizing signal VD and then counts the horizontal synchronizing signal HD input thereto from this point in time onward. Accordingly, the count in the Y counter 64 represents the Y coordinate of the window WN. The output signal from the comparator 60 is applied to latch circuits 65, 66 as latch timing signals. The latch circuits 65, 66 therefore latch the counts of the respective counters 63, 64 prevailing at this time. The X, Y coordinates of the window WN in which the value of the sum is judged to be the minimum at this point in time are held in the latch circuits 65, 66.

When the next vertical synchronizing signal VD enters, the maximum value is again preset in the latch circuit 62 and latch circuits 67, 68, 69 respectively latch the minimum value of the difference from latch circuit 62, the X coordinate of the latch circuit 65 and the Y coordinate of the latch circuit 66. Since the scanning of one picture by the window WN is concluded at this time, the minimum difference value in one picture and the X, Y coordinates of the window WN in which the minimum difference value is produced are held in the latch circuits 67, 68, 69 and applied to the CPU 17.

The text data can be created directly from the standard image data without the intermediary of dither-image creation processing and gray-level image restoration processing. More specifically, the specific partial image data is cut from the standard image data (expressed by eight bits per pixel). The area of the partial image data is subdivided into a plurality of small areas. The image data is summed for each and every small area and the result of the summing operation is divided by 256, whereby the text data is obtained. The reason for dividing by 256 is that the image data is represented by eight bits.

Second Embodiment

In the first embodiment described above, the dither image data is obtained by binarizing the input image data. According to the second embodiment, pseudo-gray-level image data (multivalued dither image data) is obtained by subjecting the input image data to a multivalued conversion (quantization to multivalues more than three values). Further, an improvement in restorability is attempted by performing smoothing processing when the pseudo-gray-level image data is restored.

Figure 11:
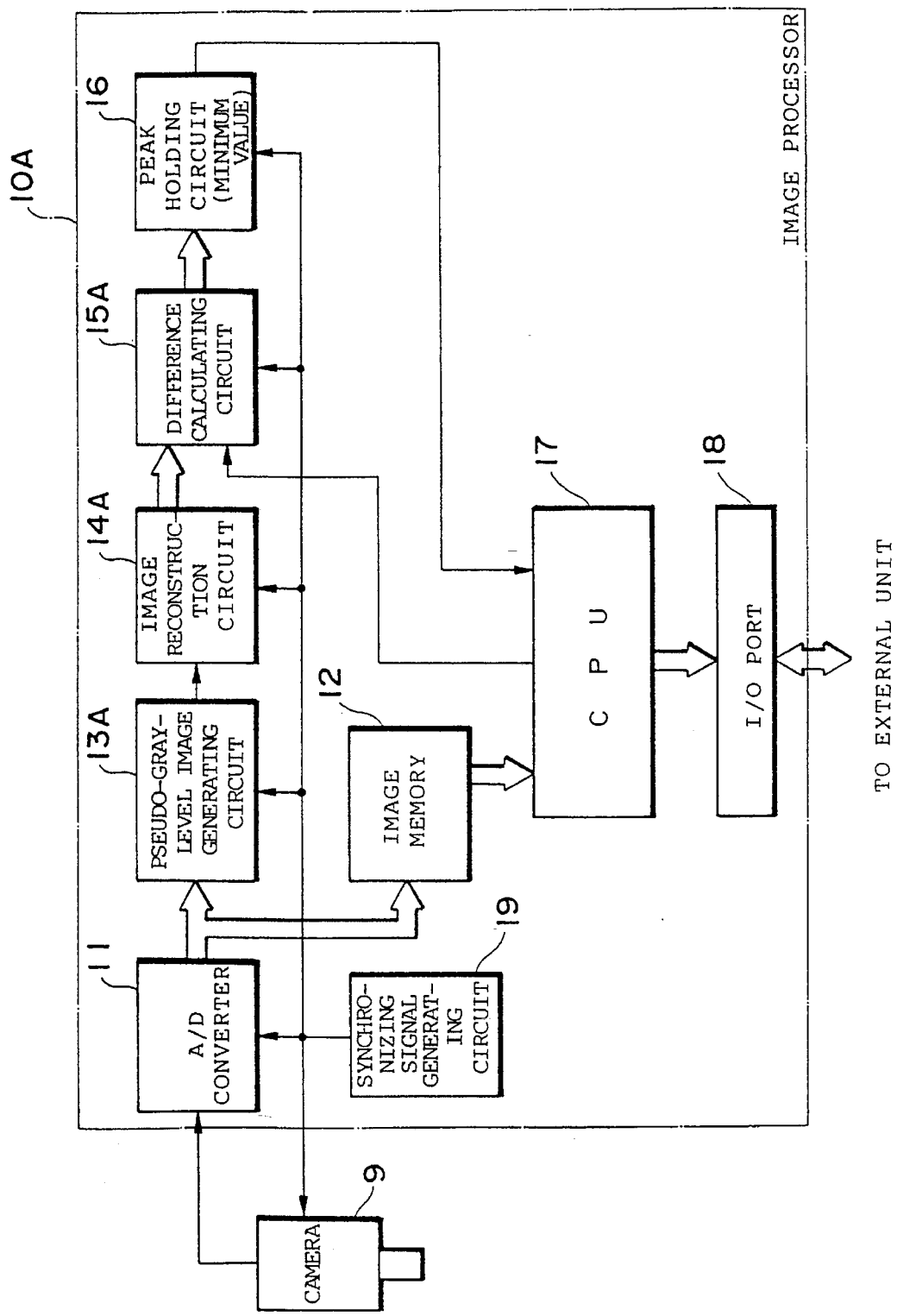
FIG. 11 is a block diagram illustrating the overall configuration of an image processor according to a second embodiment.

FIG. 11 illustrates the overall configuration of an image processor according to a second embodiment. This processor differs from that of the first embodiment shown in FIG. 1 in that the dither-image generating circuit 13, image restoration circuit 14 and difference calculating circuit 15 are replaced by a pseudo-gray-level image generating circuit 13A, an image restoration circuit 14A and a difference calculating circuit 15A. These points which distinguish this embodiment from the first embodiment will now be described.

Figure 12:
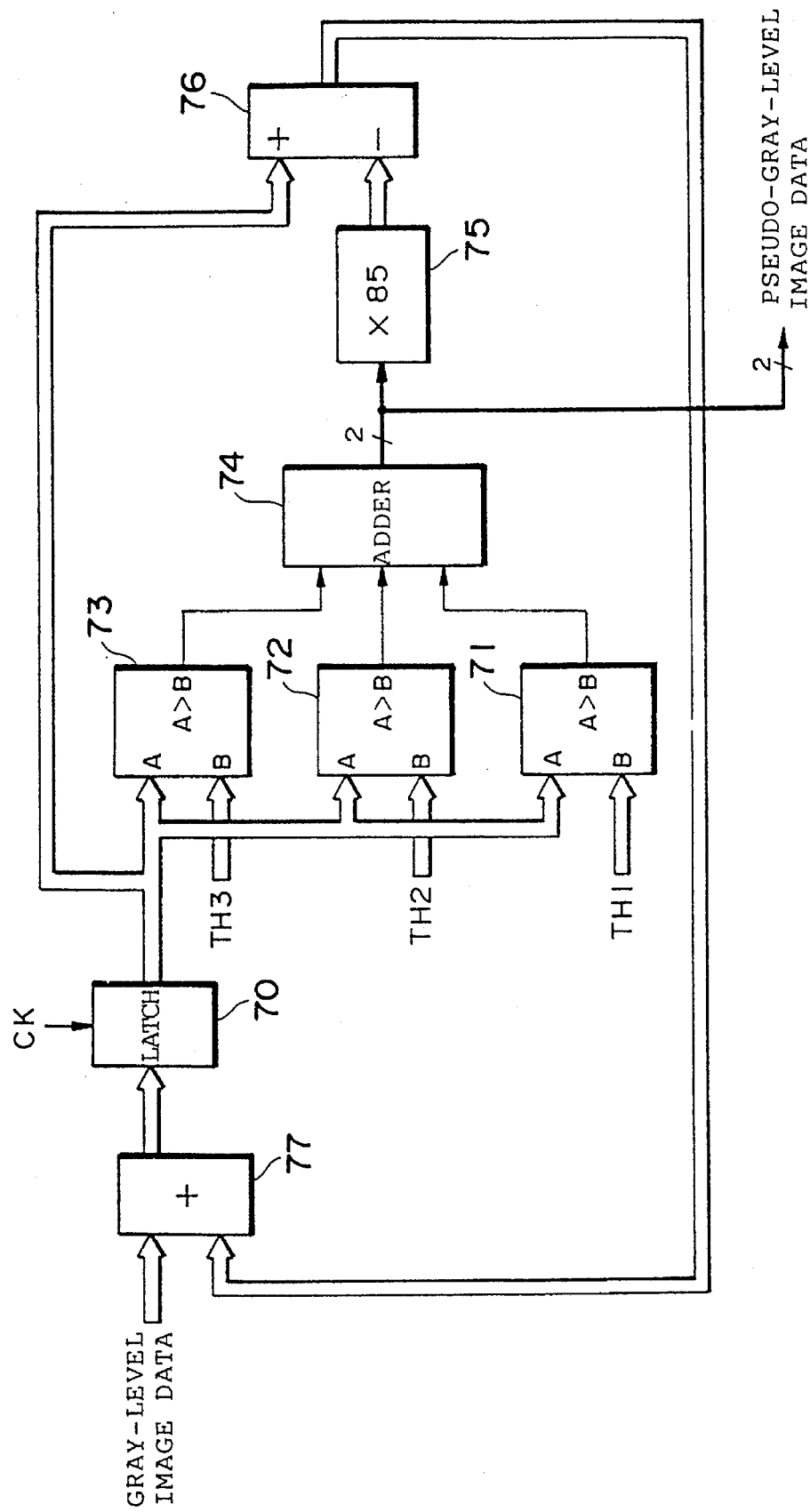
FIG. 12 is a block diagram illustrating a specific example of a pseudo-gray-scale image generating circuit.
Figure 13:
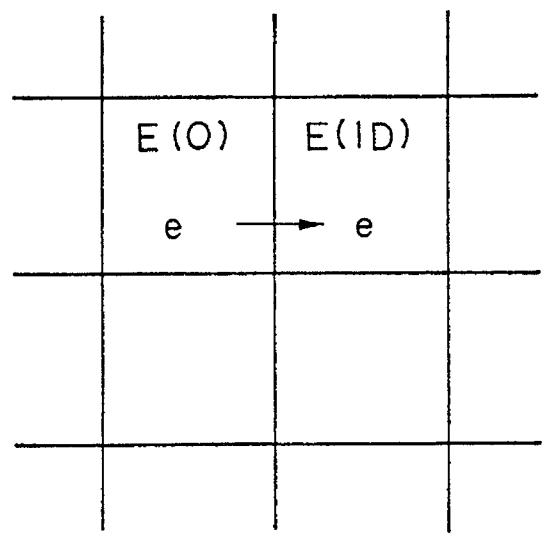
FIGS. 13 and 14 illustrate a method of multivalued processing using the error diffusion method.
Figure 14:
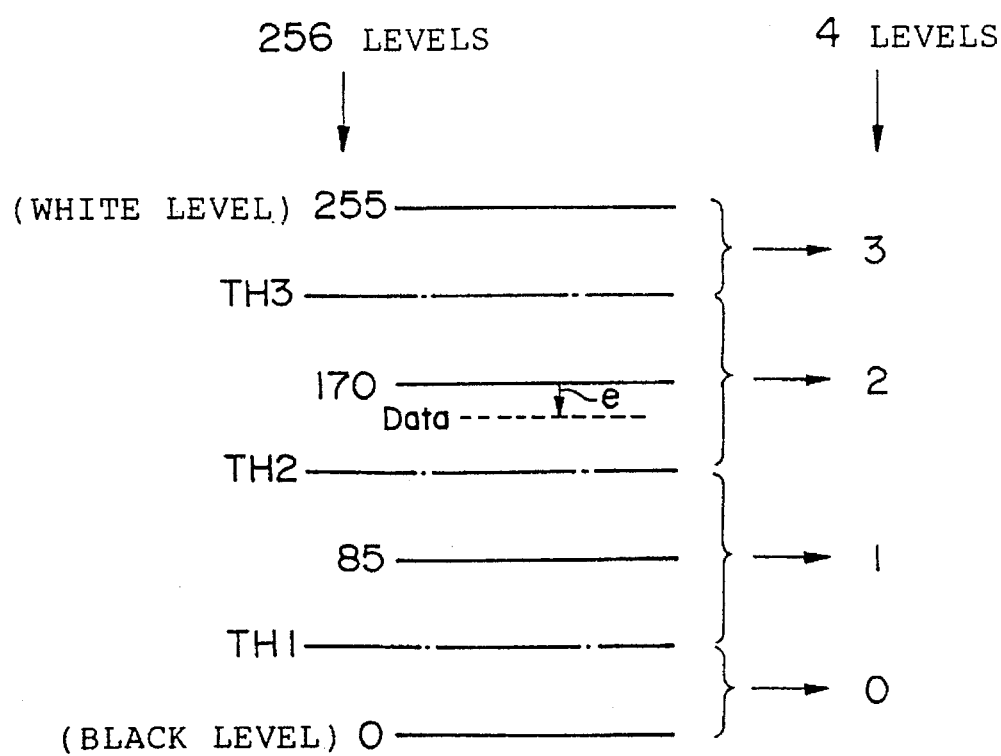

FIG. 12 shows a specific example of the construction of the pseudo-gray-level image generating circuit 13A. FIGS. 13 and 14 illustrate the principles quantization and error diffusion. Here the input image data is quantized to four values.

As mentioned above, input image data of 256 levels represented by eight bits is converted into pseudo-gray-level image data of four levels represented by two bits. To this end, as shown in FIG. 14, levels 0 (black level), 85, 170 and 255 (white level), of the 256 levels, corresponding to the levels 0, 1, 2 and 3 of the four levels are determined in advance. Threshold values TH1, TH2 and TH3 are set midway between the former levels.

The input image data Data is compared with the threshold values TH1, TH2 and TH3 and Data is quantized to pseudo-gray-level image data 00 (=0) if Data is less than the threshold value TH1; to 01 (=1) if Data is greater than the threshold value TH1 and less than the threshold value TH2; to 10 (=2) if Data is greater than the threshold value TH2 and less than the threshold value TH3, and to 11 (=3) if Data is greater than TH3. The error e produced in this quantization is represented by the following equation:

$$e = \text{Data} - (0, 85, 170 \text{ or } 255) \qquad \text{Eq. (3)}$$

In this embodiment, the quantization error e of the pixel E(0) of interest is propagated as is solely toward the succeeding pixel E(D1), as illustrated in FIG. 13.

In FIG. 12, it is assumed that the image data (eight bits) of the pixel E(0) of interest has been temporarily stored in the latch circuit 70. The image data Data is applied to the input terminal A of each of comparator circuits 71, 72 and 73. Data representing the threshold values TH1, TH2, TH3 is applied to the input terminal B of each of comparator circuits 71, 72 and 73. The comparator circuits 71, 72 and 73 each generate an output representing 1 if the input image data Data at the input terminal A is greater than the threshold-value data at the input terminal B (A>B) and generate an output representing 0 in all other cases. These comparator outputs are applied to an adder circuit 74.

The adder circuit 74 sums the comparator outputs applied thereto. The result of addition is 3 if all of the comparator circuits 71, 72, 73 generate the output 1; 2 if the two comparator circuits 71, 72 generate the output 1; 1 if only the comparator circuit 71 generates the output 1; and 0 if all of the comparator circuits 71, 72, 73 generate the output 0. The results of addition from the adder circuit 74 are outputted as pseudo-gray-level image data of two bits.

The results of addition outputted by the adder circuit 74 are applied to a multiplier circuit 75 to be multiplied by 85. The output of the multiplier circuit 75 takes on a value which is one of the above-mentioned four levels 0, 85, 170, 255 of the 256 levels.

The image data Data of the pixel E(0) of interest that has been latched in the latch circuit 70 enters the positive input terminal of a subtractor 76, and the output of the multiplier circuit 75 enters the negative input terminal of the subtractor circuit 76. The subtractor circuit 76 performs the subtraction operation given by Equation (3) and outputs data representing the error e.

The data representing the error e is applied to an adder circuit 77, where this data is added to the image data of the next pixel E(D1). The result of addition performed by the adder circuit 77 is latched in the latch circuit 70 at the timing of the next clock signal CK.

Since the above-described operation is repeated at the period of the clock signal CK, the pseudo-gray-level image generating circuit 13A outputs pseudo-gray-level image data of two bits at the period of the clock signal CK.

Figure 15:
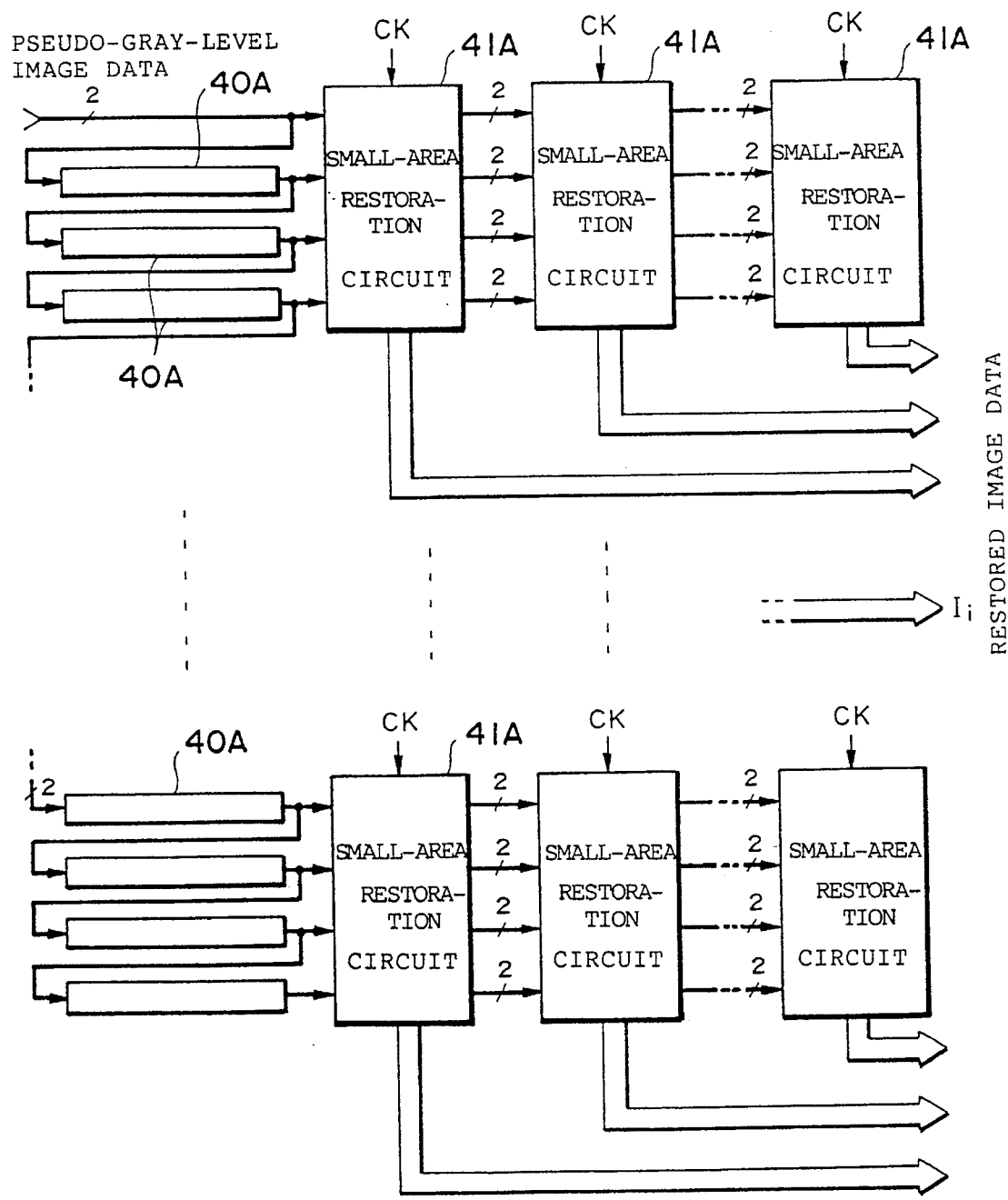
FIG. 15 is a block diagram illustrating a specific example of an image restoration circuit.

FIG. 15 illustrates the overall configuration of the image restoration circuit 14A. In comparison with the image restoration circuit 14 shown in FIG. 7, it will be seen that this circuit differs in that the one-bit line memories 40 are replaced by two-bit line memories 40A. Further, as shown in FIG. 16, the construction of a small-area restoration circuit 41A also differs from that of the small-area restoration circuit 41 illustrated earlier.

Figure 16:
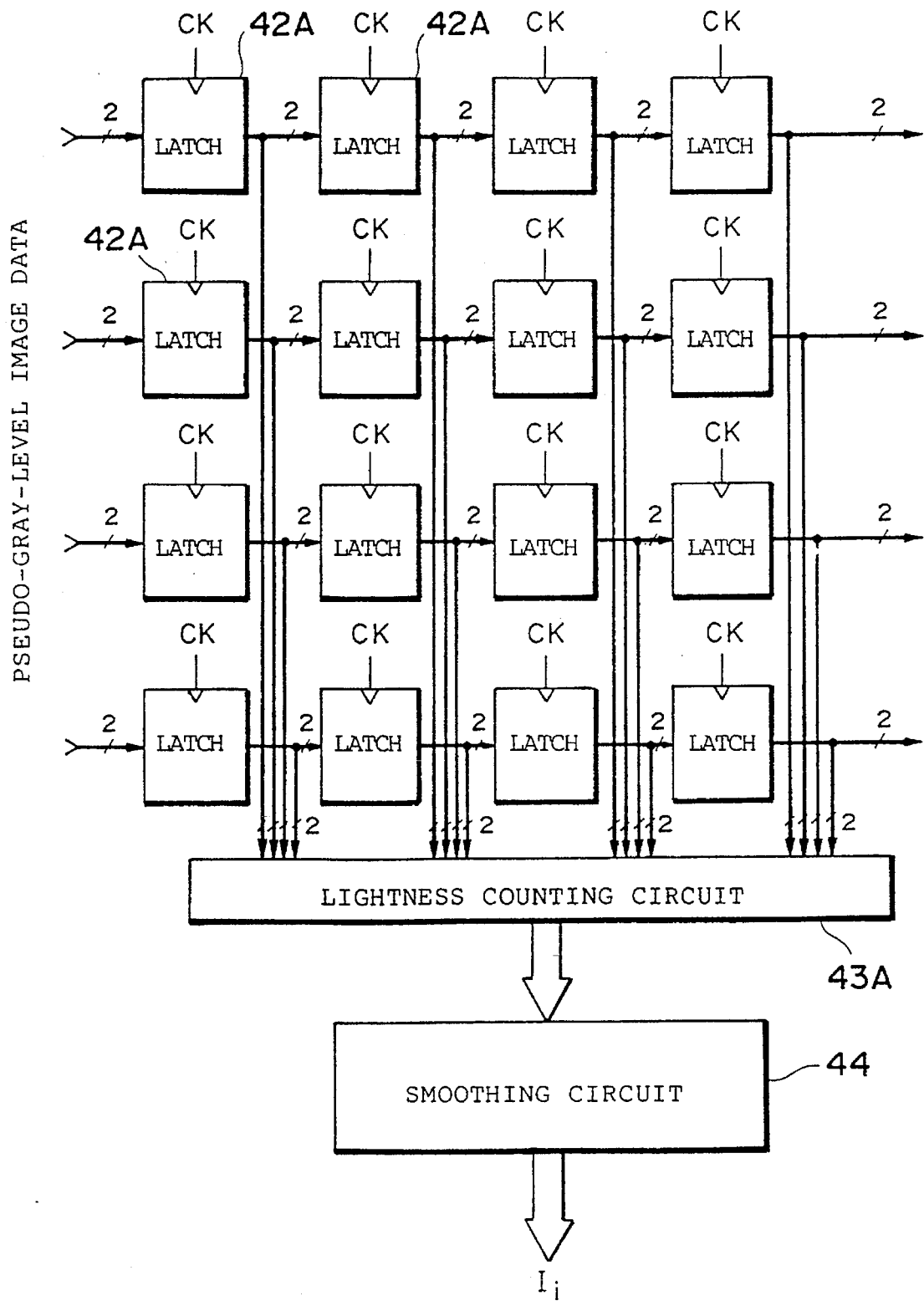
FIG. 16 is a block diagram illustrating a specific example of a small-area restoration circuit.

A specific example of the construction of the small-area restoration circuit 41A is illustrated in FIG. 16. A comparison with the small-area restoration circuit 41 shown in FIG. 8 shows that the small-area restoration circuit 41A differs in that the flip-flops 42 are replaced by two-bit latch circuits 42A. The white-pixel counting circuit 43 is replaced by a lightness counting circuit 43A. The circuit 43A is for adding two-bit signals from the 16 latch circuits 42A. Thus, the small-area restoration circuit 41A is capable of restoring pseudo-gray-level image data of four levels to image data of 48 levels, with the small area SA serving as one picture element.

In comparison with the image restoration processing according to the first embodiment, spatial resolution is the same if the size of the small area SA is the same. In the second embodiment, however, the input image data is converted into two-bit, pseudo-gray-level image data of four levels, and image restoration processing is executed using this pseudo-gray-level image data. This is advantageous in that the resolution of lightness (density) is improved.

The small-area restoration circuit 41A further includes a smoothing circuit 44. The smoothing circuit 44 sums the restored image data, which is outputted successively by the lightness counting circuit 43A, over three periods of the clock signal CK.

Figure 17:
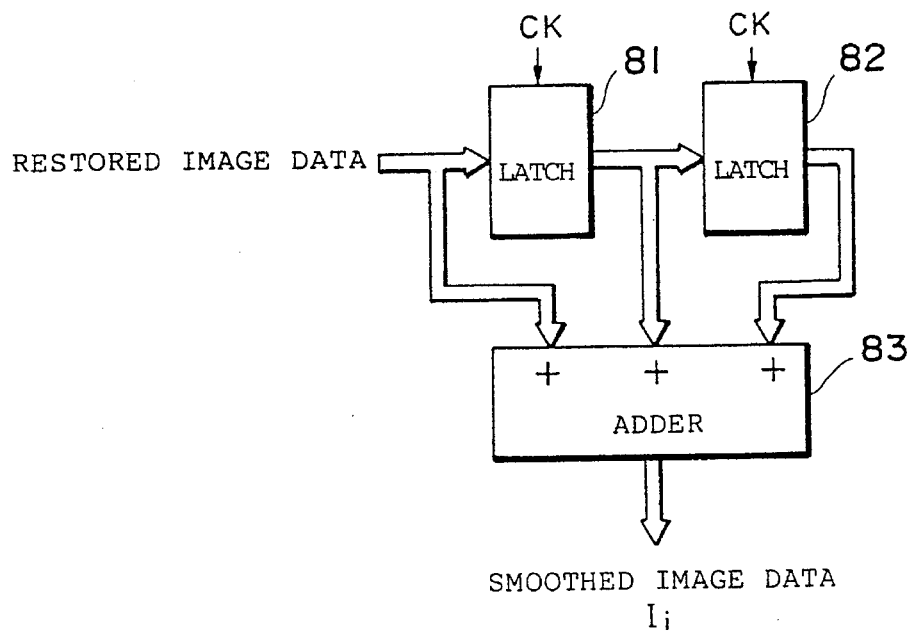
FIGS. 17 and 18 are block diagrams illustrating examples of a smoothing circuit.

An example of the smoothing circuit 44 is illustrated in FIG. 17. The restored image data outputted by the lightness counting circuit 43A is latched successively in latch circuits 81, 82 at the timing of the clock signal CK. The restored image data at a certain point in time outputted by the lightness counting circuit 43A and restored image data outputted from the latch circuits 81, 82 one and two clock periods earlier than this point in time are added in an adder circuit 83, and the sum is outputted as smoothed image data $I_i$ (for the sake of simplicity, the smoothed image data is represented by the character $I_i$, which is the same as that of the restored image data of the first embodiment).

Figure 18:
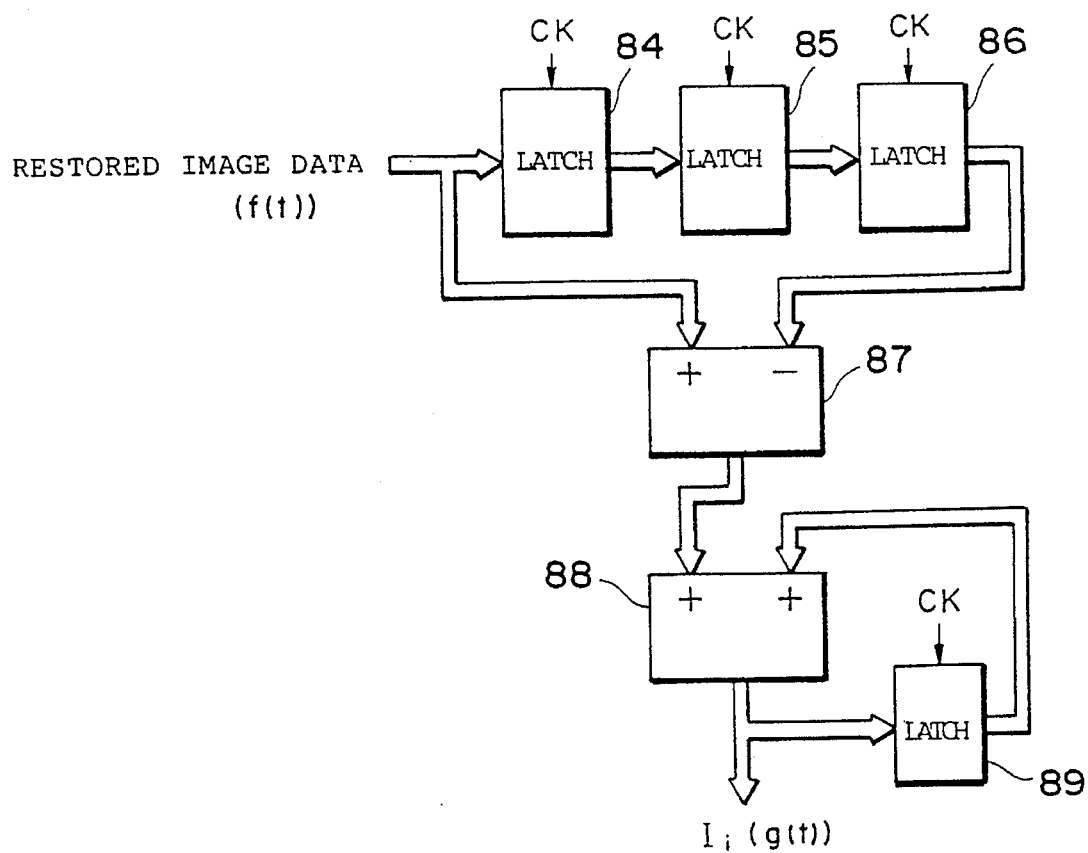

FIG. 18 illustrates another example of the smoothing circuit 44.

Let f(t) replace the restored image data at a certain time t, and let f(t−1), f(t−2) and f(t−3) replace the restored image data one, two and three clock periods earlier, respectively. Let g(t) represent the smoothed image data.

Since the smoothing circuit 44 adds the restored image data f(t), f(t−1) and f(t−2), the smoothed image data g(t) may be written as follows:

$$g(t)=f(t)+f(t-1)+f(t-2) \qquad \text{Eq. (4)}$$

Writing (t−1) for t in Equation (4), we have $$g(t-1)=f(t-1)+f(t-2)+f(t-3) \qquad \text{Eq. (5)}$$

The following equation is derived from Equations (4) and (5):

$$g(t)=g(t-1)+f(t)-f(t-3) \qquad \text{Eq. (6)}$$

The circuit of FIG. 18 executes the arithmetic operation of Equation (6). Latch circuits 84, 85, 86 latch the items of restored image data f(t−1), f(t−2), f(t−3), respectively. The arithmetic operation f(t)−f(t−3) from the second term onward on the right side of Equation (6) is executed by a subtractor circuit 87. A latch circuit 89 latches the smoothed image data g(t−1) that prevails one clock period earlier. Accordingly, the arithmetic operation on the right side of Equation (6) is performed in an adder circuit 88, and the smoothed image data g(t) is obtained. The circuit of FIG. 18 is advantageous in that the scale of the circuit is simplified in actuality in comparison with the circuit of FIG. 17.

As described in connection with FIG. 13, the error e of the pixel E(0) of interest is propagated solely toward one succeeding pixel E(D1). However, since the error in the pixel E(D1) is further propagated toward the following pixel E(D2), in actuality the error of the pixel E(0) of interest has an influence upon image data even at fairly distant pixels. The greater the distance from the pixel of interest, the smaller the degree of this influence. In accordance with the above-described smoothing processing, image restoration that takes into account the influence of the error at the pixel of interest is performed. Restorability is improved as a result. More specifically, since the restored image data of a small area is smoothing spatially, resolution in terms of lightness is raised without causing a decline in spatial resolution. The precision of matching processing in the difference calculating circuit 15A is improved. This is advantageous in a case where it is required to express minute differences in lightness, as in a low-contrast image.

The difference calculating circuit 15A is basically the same as the difference calculating circuit 15 shown in FIG. 9. Whereas 16-level restored image data is dealt with in the difference calculating circuit 15, 48-level restored and smoothed image data is dealt with in the difference calculating circuit 15A. This is the only difference.

Third Embodiment

In the first and second embodiments, the difference method used as the pattern matching technique involves calculating, for each and every small area SA, the difference in lightness between the restored image in the window WN and the standard image by means of the difference calculating circuit 15 or 15A.

In the third embodiment, the pattern-matching technique involves calculating a normalized cross-correlation value between the restored image in the window WN and the standard image.

Figure 19:
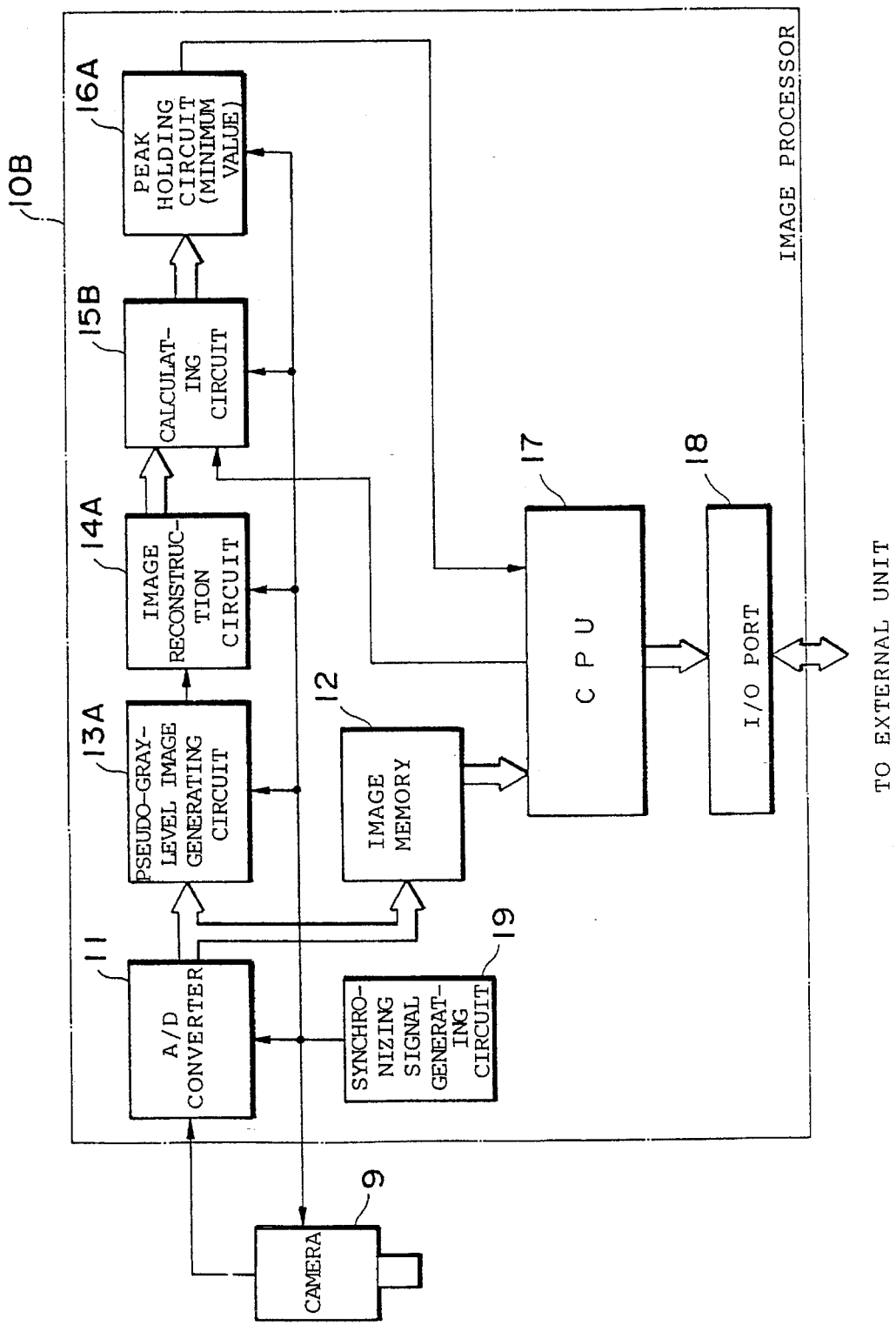
FIG. 19 is a block diagram illustrating the overall configuration of an image processor according to a third embodiment and a first application.

FIG. 19 illustrates an example of the overall configuration of an image processor according to the third embodiment. Components identical with those according to the second embodiment shown in FIG. 11 are designated by like reference characters. This embodiment differs in that the difference calculating circuit 15A and the peak holding circuit 16 for detecting a minimum value are replaced by a correlation-value calculating circuit 15B and a peak holding circuit 16A for detecting a maximum value, respectively. The dither-image generating circuit 13 and the image restoration circuit 14 according to the first embodiment shown in FIG. 1 can be used instead of the pseudo-gray-level image generating circuit 13A and image restoration circuit 14A, respectively.

As described in the first or second embodiment, the image restoration circuit 14 or 14A outputs the restored image data $I_i$ [i=1~r; r=(N/n)×(M/m)] within the window WN, and this image data is applied to the correlation-value calculating circuit 15B. The restored image data $I_i$ is represented with the small area SA serving as picture element. The number of small areas SA is 256 in terms of the example described above. That is, r=256. Meanwhile, the CPU 17 outputs the corresponding image data (text data) $M_i$ (i=1~r) regarding the standard image, which is the matching criterion. This image data is applied to the correlation-value calculating circuit 15B. These items of image data Mi are held in a temporary memory circuit, such as a text register, in the correlation-value calculating circuit 15B. A normalized cross-correlation value R is calculated in the correlation-value calculating circuit 15B in accordance with the following equation:

$$R^2=[r(\Sigma IM)-(\Sigma I)(\Sigma M)]^2/[r(\Sigma I^2)-(\Sigma I)^2]\cdot[r(\Sigma M^2)-(\Sigma M)^2] \qquad \text{Eq. (7)}$$

where Σ represents addition with regard to i=1~r.

The correlation value R is calculated for the window WN at each position scanned, and the calculated correlation value R is applied to the peak holding circuit 16A. The peak holding circuit 16A detects the maximum value of the applied correlation value R and, when the scanning of the window regarding one picture ends, outputs this maximum value as well as the coordinates of the position of the window WN in which the maximum value was produced. The maximum value and the coordinates are applied to the CPU 17.

In a manner identical with that of the first and second embodiments, the CPU 17 compares the applied maximum correlation value with the predetermined threshold value and construes that the sought partial image has been found if the maximum correlation value exceeds the threshold value. The partial image found (the image within the window that provides the maximum correlation value) is displayed on a display unit or subjected to various types of measurement processing.

Figure 20:
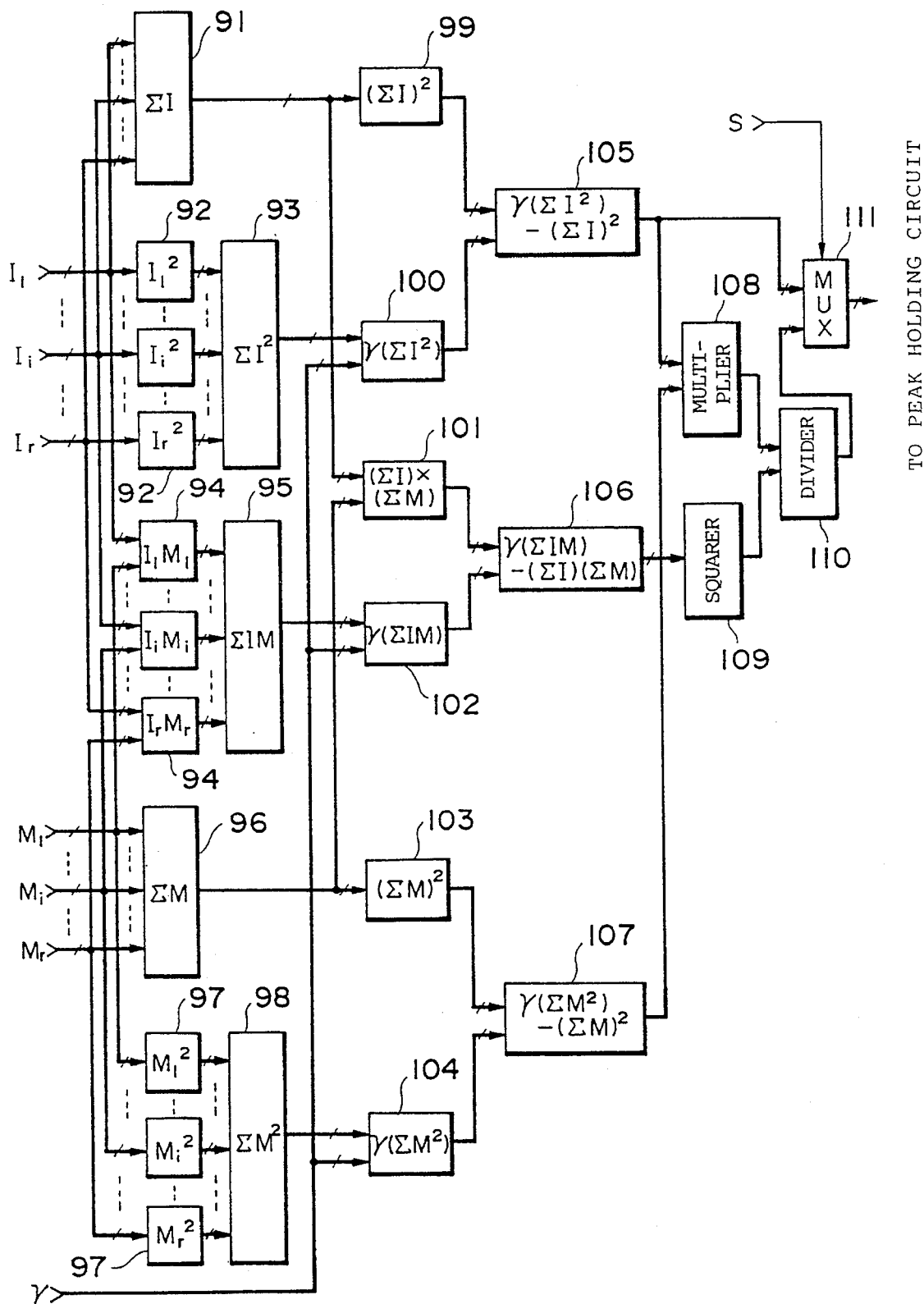
FIG. 20 is a block diagram illustrating a specific example of a cross-correlation calculating circuit.

FIG. 20 illustrates an example of the construction of the correlation-value calculating circuit 15B.

The sum $\Sigma I$ of the restored image data $I_i$ is calculated by an adder circuit 91, and the square of the sum $(\Sigma I)^2$ is calculated in a squaring circuit 99. The square $I_i^2$ of each item of restored image data $I_i$ is calculated by r-number of squaring circuits 92, and the sum $\Sigma I^2$ of the squares is calculated in an adder circuit 93.

The product $I_iM_i$ of the restored image data Ii and the text data $M_i$ corresponding thereto is calculated in respective ones of r-number of multiplier circuits 94, and the sum $\Sigma IM$ of these products is calculated in an adder circuit 95.

With regard also to the text data $M_i$, the sum $\Sigma M$ of the text data Mi is calculated in an adder circuit 96 and the square $(\Sigma M)^2$ of this sum is calculated by a squaring circuit 103, in the same manner as the restored image data $I_i$. The squares $M_i^2$ of these items of text data $M_i$ are calculated in respective ones of r-number of squaring circuits 97, and the sum $\Sigma M^2$ of these squares $M_i^2$ is calculated in an adder circuit 98.

The product $(\Sigma I)(\Sigma M)$ of the sum $\Sigma I$ of the restored image data obtained from the adder circuit 91 and the sum $\Sigma M$ of the text data obtained from the adder circuit 96 is calculated by a multiplier circuit 101. Meanwhile, data representing the number r of small areas is provided by the CPU 17, and the product $r(\Sigma IM)$ of the number r and the value $\Sigma IM$ obtained from the adder circuit 95 is calculated by a multiplier circuit 102. The difference between the output of the multiplier circuit 102 and the output of the multiplier circuit 101 is calculated by a subtractor circuit 106, and the square of the result of the subtraction operation is calculated by a squaring circuit 109, whereby the numerator of Equation (7) is obtained.

The product $r(\Sigma I^2)$ of the output $\Sigma I^2$ of adder circuit 93 and the number r of small areas is calculated by a multiplier circuit 100, and the output $(\Sigma I)^2$ of the squaring circuit 99 is subtracted from this product by a subtractor circuit 105. Similarly, the product $r(\Sigma M^2)$ of the output $\Sigma M^2$ of adder circuit 98 and the number r of small areas is calculated by a multiplier circuit 104, and the output $(\Sigma M)^2$ of the squaring circuit 103 is subtracted from this product by a subtractor circuit 107. The results of subtraction performed by these subtractor circuits 105, 107 are multiplied together by a multiplier circuit 108, whereby the denominator of Equation (7) is obtained.

The output of the squaring circuit 109 is divided by the output of the multiplier circuit 108 in a divider circuit 110, whereby the value $R^2$ on the left side of Equation (7) is obtained.

A multiplexer 111 and a selection signal S will be described in detail in an example of a first application discussed later. In any case, the square $R^2$ of the correlation value obtained by the divider circuit 110 is applied to the peak holding circuit 16A through the multiplexer 111.

The processing for calculating the correlation value is executed during one period of the clock, and the correlation value R is obtained for the window WN at each and every position.

It goes without saying that processing equivalent to that of the arithmetic circuitry (hardware circuitry) shown in FIG. 20 is capable of being executed by a computer programmed so as to execute this processing. This is applicable also to the processing in the other circuit blocks illustrated in FIG. 1, FIG. 11 or FIG. 19.

First Example of Application

The first example of application is one in which the image processor according the third embodiment illustrated in FIGS. 19 and 20 is applied in order to sense a scratch or stain on the surface of an object.

In the case of shading or an irregularity in illumination, or in a case where a uniform pattern is described on the surface of an object, extracting a scratch or a stain on the surface of the object is difficult in terms of image processing technology.

Figure 21A:
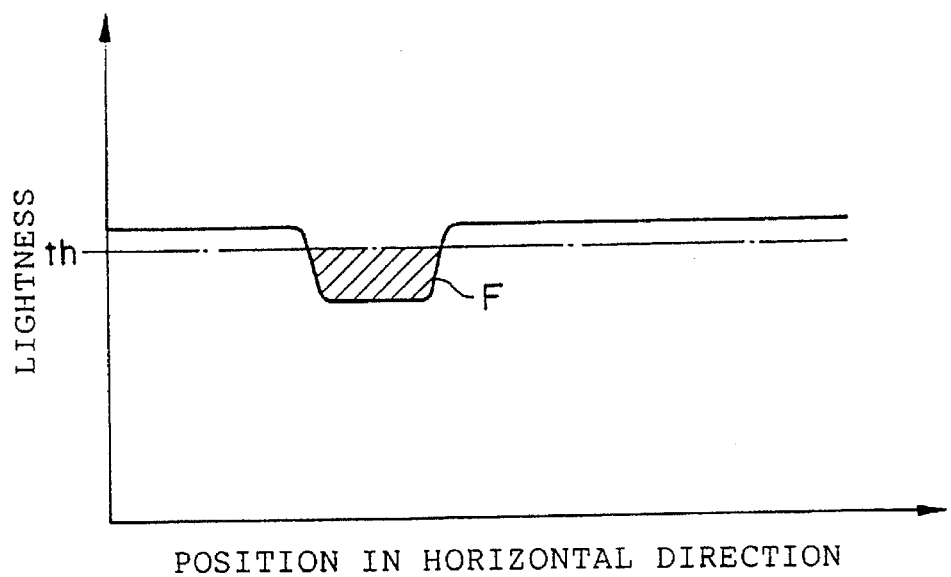

FIG. 21a illustrates a change in lightness of image data along a horizontal scanning line traversing a scratch or stain in a case where the scratch or stain is present on the surface of an object having a uniform lightness. Since lightness declines at the portion of a scratch or stain, it is possible in principle to extract the scratch or stain if the lightness of the image data is subjected to level discrimination using an appropriate threshold value th.

Figure 21B:
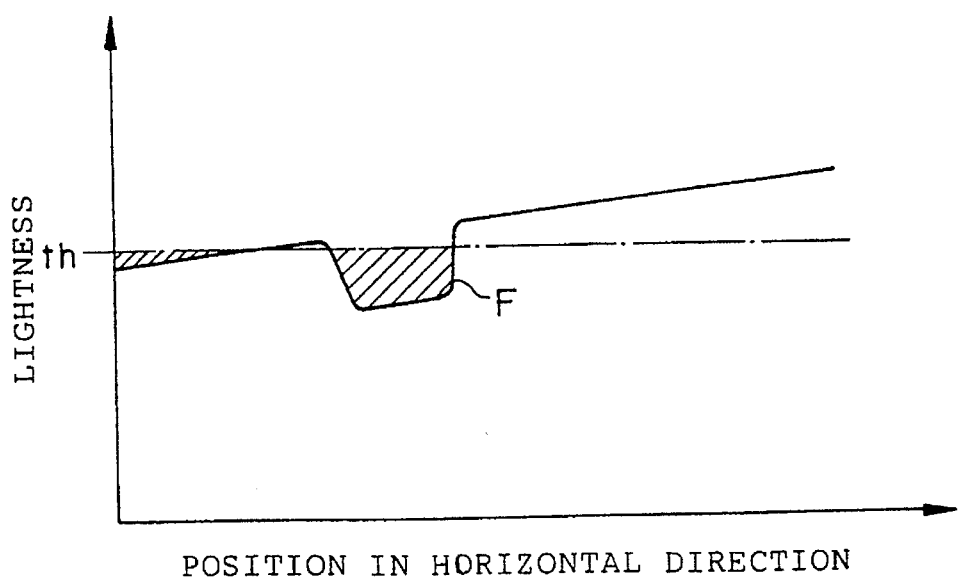

However, when shading or an irregularity in illumination is present, the lightness of the background differs depending upon the location, as depicted in FIG. 21b. Therefore, even if the lightness represented by the image data is binarized using the fixed threshold value th, an unscratched or unstained portion will be extracted as a scratch or stain.

Figure 22:
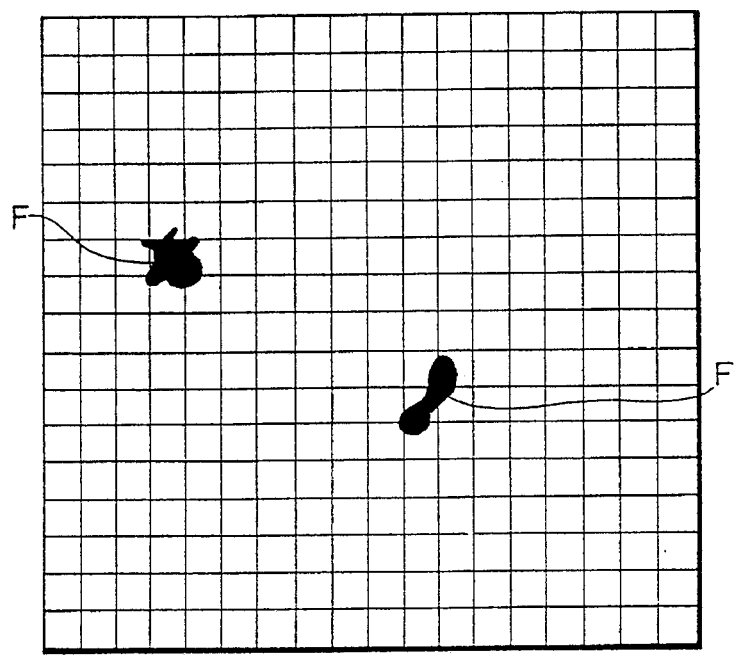
FIG. 22 illustrates an example of the surface of an object having a uniform pattern on which a scratch or stain is present.

Consider a case in which a uniform pattern composed of straight lines drawn finely and regularly in the vertical and horizontal directions is represented on the surface of an object, as shown in FIG. 22. Separating solely a scratch or stain F from the background pattern by binarization processing in order to inspect for the scratch or stain F, which is present in this fine and uniform pattern, is very difficult or nearly impossible since the shading of the background is distributed over a wide area and varies in minute fashion.

The first application is so adapted that a scratch or stain in a fine, uniform pattern can be detected without using a processing technique, namely binarization processing, that is readily susceptible to environmental changes and without being influenced by shading or irregularities in lightness.

Figure 23A:
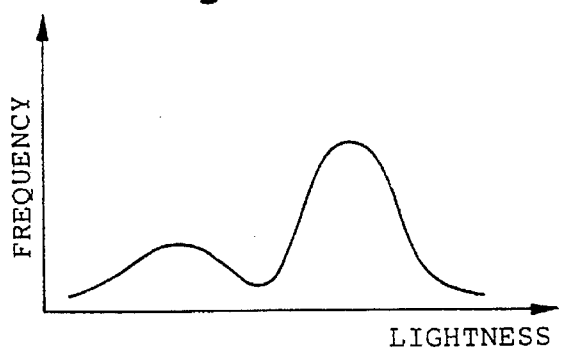

FIG. 23a illustrates a lightness histogram of image data obtained by imaging a uniform pattern (a case in which there is no scratch or stain) of the kind shown in FIG. 22. If it is assumed that the lightness of a uniform pattern (horizontal and vertical straight lines) is relatively low and that the lightness of the background (a portion devoid of horizontal and vertical straight lines) is relatively high, then a large peak will appear at a portion of high lightness and a small peak at a position of low lightness.

Figure 23B:
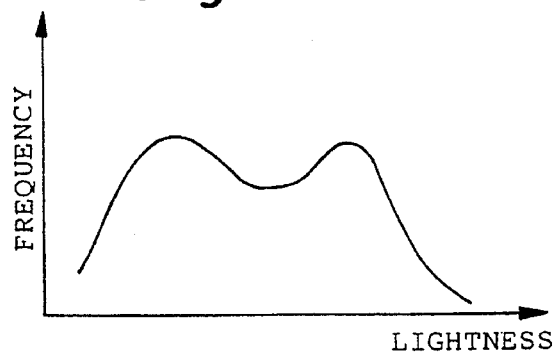

On the other hand, in a case where a scratch or stain is present in a uniform pattern, a broad, high peak appears in the lightness histogram at a position of low lightness, as shown in FIG. 23b.

As will be understood from a comparison of these histograms, a variance $\sigma^2$ or a standard deviation $\sigma$ in lightness when the scratch or stain F is present becomes larger in comparison with a case in which there is no scratch or stain. Accordingly, the variance or standard deviation can be calculated with regard to the lightness of the image data of a subject, and a scratch or stain can be discriminated if the value calculated is greater than a predetermined threshold value.

The variance or standard deviation of lightness may be calculated with regard to the entirety of image data obtained by imaging the surface of an object. Alternatively, as in the above-described embodiments, an arrangement may be adopted in which a partial image is clipped from image data, which has been obtained by imaging the surface of an object, using a window, and the variance or standard deviation of lightness is calculated with regard to the partial image data clipped. In the latter case, it is preferred that the position of the partial image to be clipped be moved by scanning the image data by a window, and that the maximum value of the variance or standard deviation obtained from the partial image be compared with a predetermined threshold value.

The latter method can be realized with ease in the image processor of the third embodiment shown in FIGS. 19 and 20.

In FIG. 20, the value $[r(\Sigma I^2)-(\Sigma I)^2]$ outputted from the subtractor circuit 105 is equal to $r^2\sigma^2$. When the image processor is used for the purpose of pattern matching, the multiplexer 111 selects the output [$R^2$ indicated by Eq. (7)] of the divider circuit 110. When the image processor is used to inspect for a scratch or stain, the multiplexer 111 selects the output of the subtractor circuit 105. The selected output is applied to the peak holding circuit 16A. Changeover of the multiplexer 111 is controlled by a control signal outputted by the CPU 17.

Accordingly, in inspection for a scratch or stain, the value $r^2\sigma^2$ outputted by the subtractor circuit 105 is applied to the peak holding circuit 16A. The peak holding circuit 16A detects the maximum value, in one vertical scanning interval V, from among the values $r^2\sigma^2$ that enter every clock period, and applies this maximum value to the CPU 17 along with the coordinates of the window in which the maximum value was produced.

The CPU 17 compares the maximum value of $r^2\sigma^2$, provided by the peak holding circuit 16A, with a predetermined threshold value or calculates the variance $\sigma^2$ or standard deviation $\sigma$ from the maximum value of $r^2\sigma^2$ and compares this calculated value with a predetermined threshold value. If the threshold value is exceeded, the CPU judges that a scratch or stain is present.

An advantage of this application is that an inspection for scratches or stains can be performed rapidly at a video rate.

Second Application

An example of a second application relates to a positioning apparatus for two transparent plates on which transparent electrodes are formed and between which a liquid crystal is held in a liquid-crystal device, or a positioning apparatus for a mask in a process for manufacturing semiconductors.

FIG. 24 illustrates the overall construction of this positioning apparatus.

There are two plates (inclusive of films) 121, 122 to be positioned. The plate 121 on the upper side is a first layer and a plate 122 on the lower side is a second layer. The plate 122 on the lower side is fixed. The plate 121 on the upper side is clamped to an XY table 123 and is capable of being moved in X and Y directions.

Figure 25A:
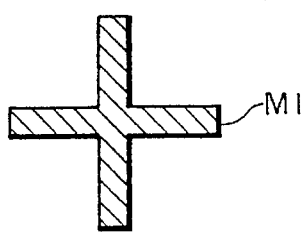
FIGS. 25a and 25b illustrate examples of positioning marks.

A cross-shaped positioning mark M1 of the kind shown in FIG. 25a is indicated at a prescribed position (e.g., one corner) on the plate 121 of the first layer on the upper side.

Figure 25B:
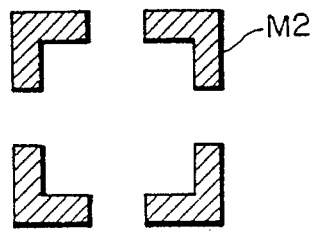

A positioning mark M2, which comprises four frame-like shapes for enclosing the mark M1, as shown in FIG. 25b, is indicated on the plate 122 of the second layer on the lower side at a position thereof corresponding to the mark M1.

The two marks M1 and M2 are such that when the two plates 121 and 122 have been correctly positioned, the cross-shaped mark M1 will fit exactly in the gap defined by the frame-like shapes of the mark M2. At least the portions of the two plates 121, 122 on which the marks M1, M2 are indicated are transparent so that it is possible to view both of the marks M1, M2 when the two plates 121, 122 are superimposed.

Figure 26:
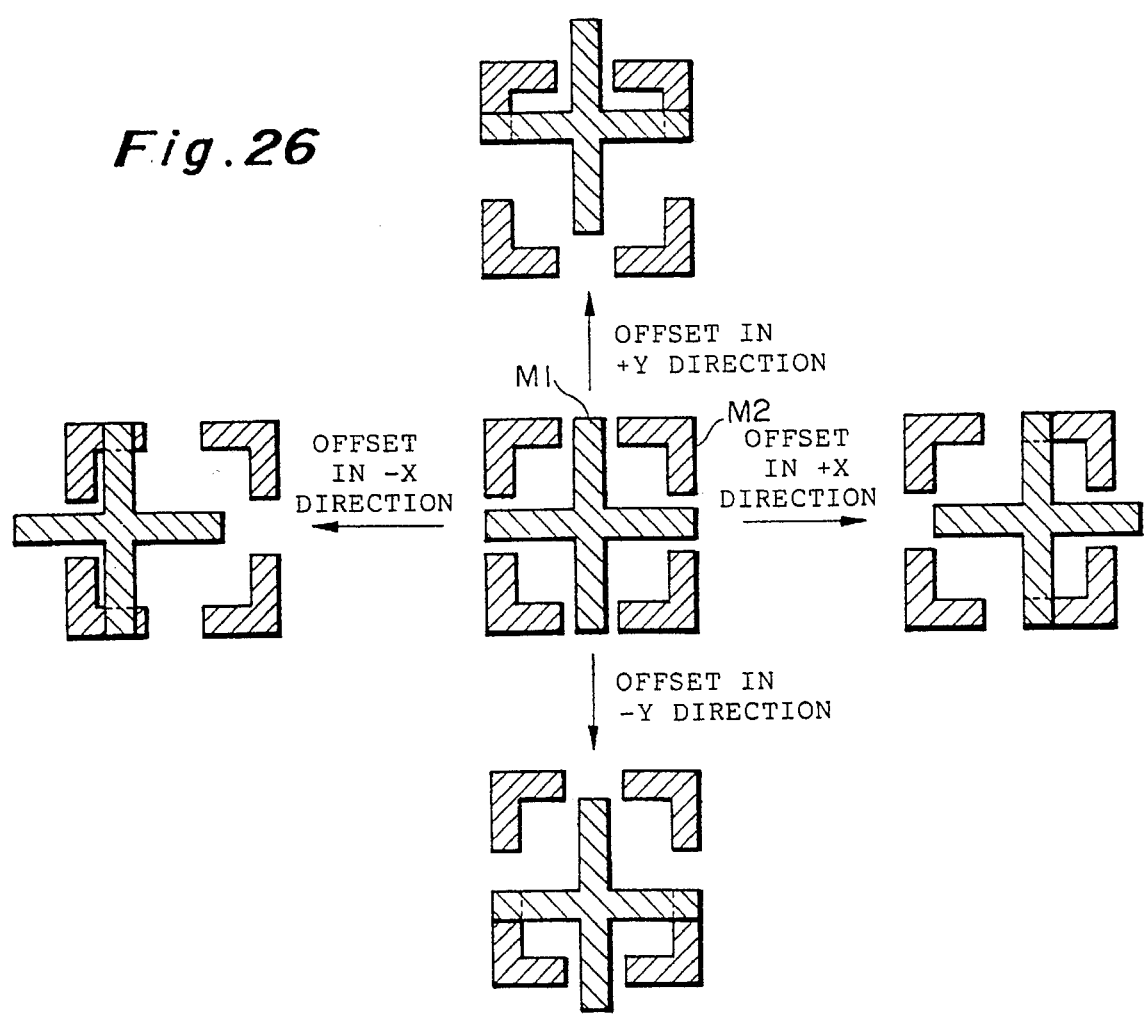
FIG. 26 illustrates the manner in which a positional offset appears in a positioning-mark pattern.

If the positions of the two plates 121, 122 are not in agreement, the two marks M1 and M2 will not be in the correct relation, as illustrated on the left and right sides or upper and lower sides of FIG. 26, and therefore the pattern viewed will be offset from the pattern shown at the center.

Accordingly, the pattern formed by the two marks M1, M2 shown at the center of FIG. 26 is registered beforehand as a standard image (standard pattern), the mark pattern indicated in conformity with the relation between the marks M1 and M2 stipulated by the positional relationship between the two plates 121, 122 prior to positioning is photographed by the video camera, and a correlation value (or a difference in lightness) between the photographed image and the standard image is calculated, whereby the positional offset between the two plates 121 and 122 can be detected. By controlling the XY table 123 in dependence upon the results of detection, the plate 121 can be positioned relative to the plate 122 in such a manner that the two marks M1 and M2 will form the standard pattern.

With reference again to FIG. 24, the video camera 9 is placed at a position at which it is capable of photographing both of the marks M1 and M2 (at a position at which at least the mark M2 of the fixed plate 122 is capable of being photographed). The video signal outputted by the camera 9 representing the pattern formed by the marks M1, M2 is applied to a correlation-value calculating unit 10C.

The correlation-value calculating unit 10C basically is realized by the image processor 10, 10A or 10B shown in FIGS. 1, 11 or 19. In order to raise positioning accuracy, it is preferred that the size of the window be made as large as possible. The window may have a size equivalent to that of one screen. Of course, the window may have a size on the order of that described in the foregoing embodiments. An arrangement may be adopted in which a window having such a size and position that the mark M2 of the fixed lower plate 122 is covered by the window is fixed, and only a difference value or correlation value regarding this window is outputted. The mark pattern shown at the center of FIG. 26 is employed as the reference image, and text data regarding this image is created in advance and stored.

It will be assumed for the sake of convenience that the image processor 10B shown in FIG. 19 is used. The maximum value of the correlation values supplied to the CPU 17 from the peak holding circuit 16A every vertical scanning interval V is sent from the CPU 17 to an XY table controller 120 through the I/O port 18.

Figure 27:
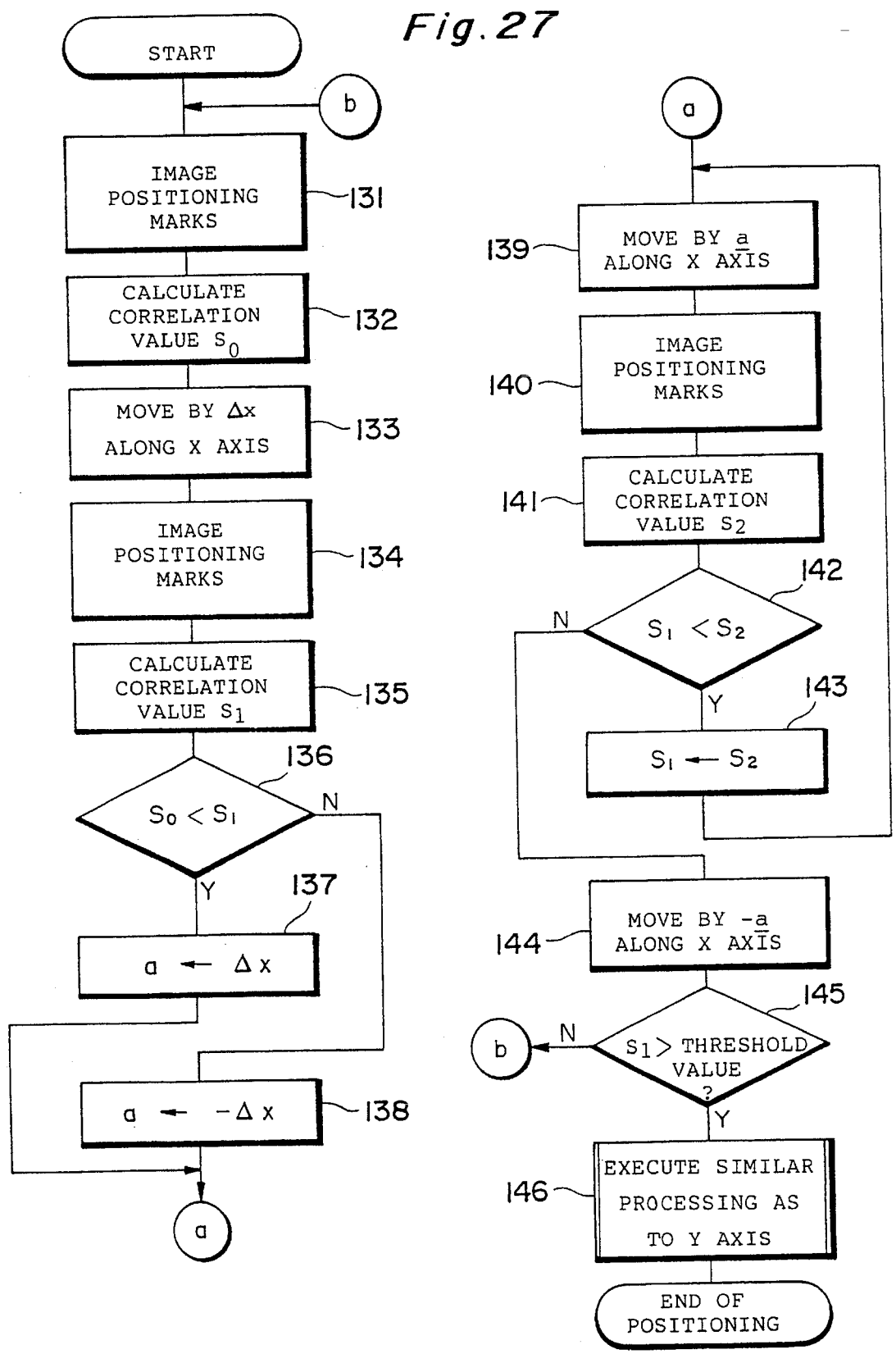
FIG. 27 is a flowchart illustrating the procedure of positioning processing.

On the basis of the maximum correlation value (hereinafter referred to simply as a correlation value), the XY table controller 120 controls the XY table 123 in accordance with the processing procedure shown in FIG. 27, thereby positioning the plate 121.

It will be assumed that the two plates 121, 122 are already roughly positioned. With reference now to FIG. 27, the mark pattern comprising the marks M1 and M2 is photographed by the camera 9 (step 131). The initial correlation value $S_0$ of the photographed image with respect to the standard image is calculated in the correlation-value calculating unit 10C (step 132).

Under the control of the XY table controller 120, the plate 121 on the upper side is displaced a minute distance $\Delta x$ along the X axis (step 133). Thereafter, the photography of the mark pattern and the calculation of a correlation value $S_1$ are performed again (steps 134, 135).

The larger the correlation value, the more the photographed image resembles the standard image. If the correlation value $S_1$ is larger than the initial correlation value $S_0$ (step 136), this means that the mark M1 has been moved closer to the correct position owing to the displacement of $\Delta x$ at step 133. Therefore, since the mark M1 (plate 121) should be displaced further in the same direction, a subsequent amount of displacement a is substituted for $\Delta x$ (step 137). When a result that is the opposite of the foregoing is obtained, this means that the displacement of $\Delta x$ is erroneous and, hence, the mark M1 should be displaced in the opposite direction. Accordingly, $-\Delta x$ serves as the subsequent amount of displacement a (step 138).

After the plate 121 is again moved by the amount of displacement a thus determined (step 139), photography and calculation of $S_2$ are performed (steps 140, 141).

The earlier correlation value $S_1$ and the present correlation value $S_2$ are compared (step 142). If the present correlation value $S_2$ is larger, this means that the movement of step 139 was correct. In order to effect movement again in the same direction and over the same distance, the program returns to step 139 upon replacing $S_1$ with the present correlation value $S_2$ (step 143).

If the present correlation value S2 becomes smaller than the immediately preceding correlation value S1 during the repetition of the processing of steps 139~143, this means that there has been too much movement. Accordingly, the plate 121 is moved by the amount of displacement a in the opposite direction (step 144) and it is verified that the immediately preceding correlation value S1 is greater than the predetermined threshold value (step 145) and positioning along the X axis is concluded. If the correlation value S1 has not attained the threshold value, positioning along the X axis done again.

This is followed by making a transition to positioning along the Y axis. Positioning along the Y axis is the same as that of steps 131~145 for positioning processing along the X axis; the only difference is the direction of the axis (step 146).

In this example of application, a correlation value is obtained at one vertical scanning interval V. As a result, the speed of positioning feedback can be increased to shorten positioning time.

Third Application

A third example of application relates to an automatic tracking system for a moving subject.

Figure 28:
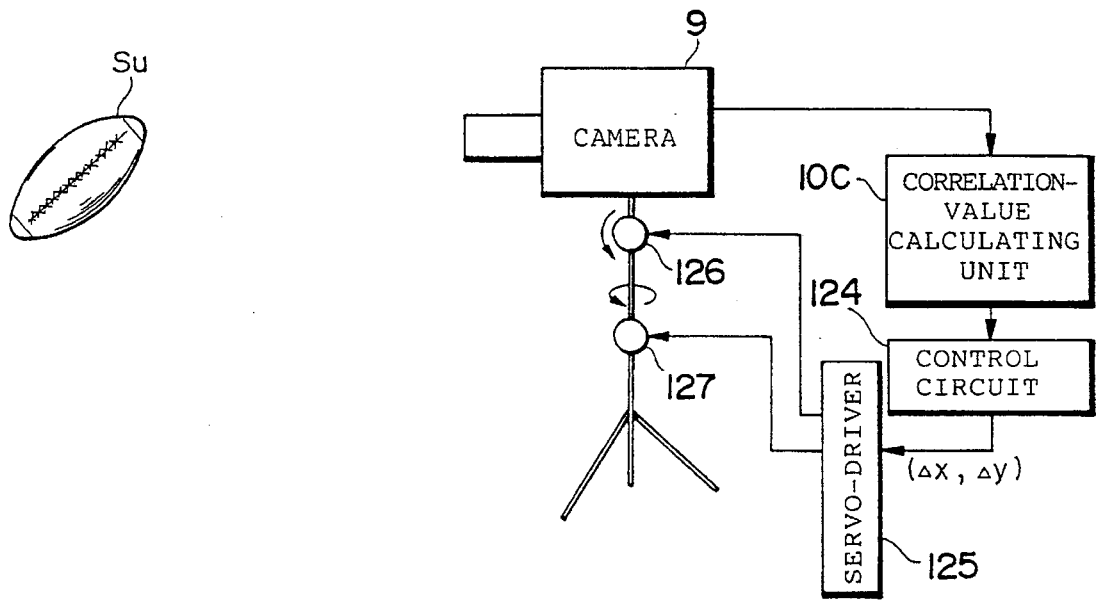
FIG. 28 illustrates the overall configuration of an automatic tracking system, which is a third application.

As shown in FIG. 28, the video camera 9 photographs a subject Su and outputs a video signal representing the subject. This video signal is applied to a correlation-value calculating unit 10C. The camera 9 is supported so as to be free to tilt and swivel. The camera is driven in the tilt direction by a motor 126 and in the swivel direction by a motor 127. The correlation-value calculating unit 10C is the same as that of the second application shown in FIG. 24. In response to a signal provided by the correlation-value calculating unit 10C, a control circuit 124 controls a servo-driver 125 to drive the motors 126, 127 in such a manner that the subject Su will be at a prescribed position within the field of view of the camera 9 at all times. Thus, the camera 9 is made to track the subject Su.

Figure 29:
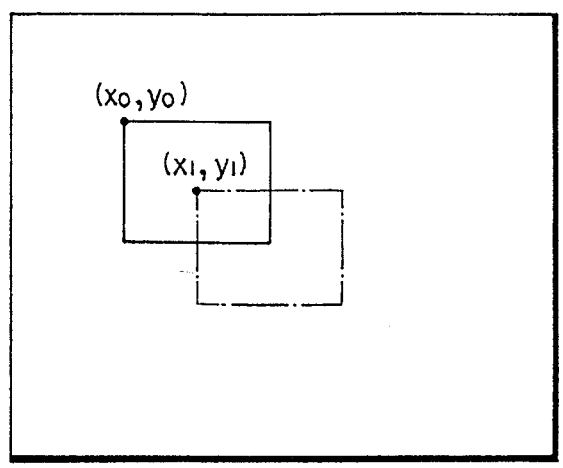
FIG. 29 shows the manner in which a window containing the image of a subject moves.

In order that the subject Su to be tracked will occupy the prescribed position within the field of view of the camera 9, first the camera 9 is positioned by the operator. The subject Su is photographed and text data of a standard image is created in the correlation-value calculating unit 10C based upon the video signal obtained by photography. The positional coordinates $(x_0, y_0)$ of the window used when this text data is created are applied to the control circuit 124 from the CPU of the unit 10C (it is necessary that the subject Su be included within the window). The window is indicated by the solid lines in FIG. 29 along with the coordinates $(x_0, y_0)$ of the window.

Next, the subject Su is photographed by the camera 9 after it starts to move, and the video signal representing the subject Su is applied to the correlation-value calculating unit 10C. The latter calculates the correlation value between the image data of the subject photographed at each position of the scanned window and the text data obtained previously, and the coordinates $(x_1, y_1)$ of the window for which the correlation value is highest are applied to the control circuit 124. The window giving the maximum correlation value is described by the phantom lines in FIG. 29 along with the coordinates $(x_1, y_1)$ of this window. The image of the subject Su should appear in this window.

The control circuit 124 calculates the amount of movement of the subject Su as $\Delta x = x_1 - x_0$ and $\Delta y = y_1 - y_0$, and a command corresponding to this amount of movement $\Delta x$, $\Delta y$ is applied to the servo-driver 125. As a result, the motors 126, 127 are driven and the attitude of the camera 9 is changed in such a manner that the image of the subject Su will fall within the window of coordinates $(x_0, y_0)$.

Since the above-described operation is repeated every vertical scanning interval, the attitude of the camera 9 is so controlled that the image of the subject Su always falls within the window of coordinates $(x_0, y_0)$.

Since feedback processing for tracking the subject is repeated every vertical scanning interval, a smooth tracking operation can be expected.

Depending upon the subject Su, there are cases in which the attitude of the subject is changed while it is moving. When the attitude of the subject Su changes, the photographic image thereof also changes. This means that the text data registered earlier will no longer represent the image of the subject correctly.

Next, an automatic tracking system will be described in which the camera can be made to follow the subject correctly even if the attitude of the subject Su is changed while the subject is moving and the image of the subject changes as a result.

Figure 30:
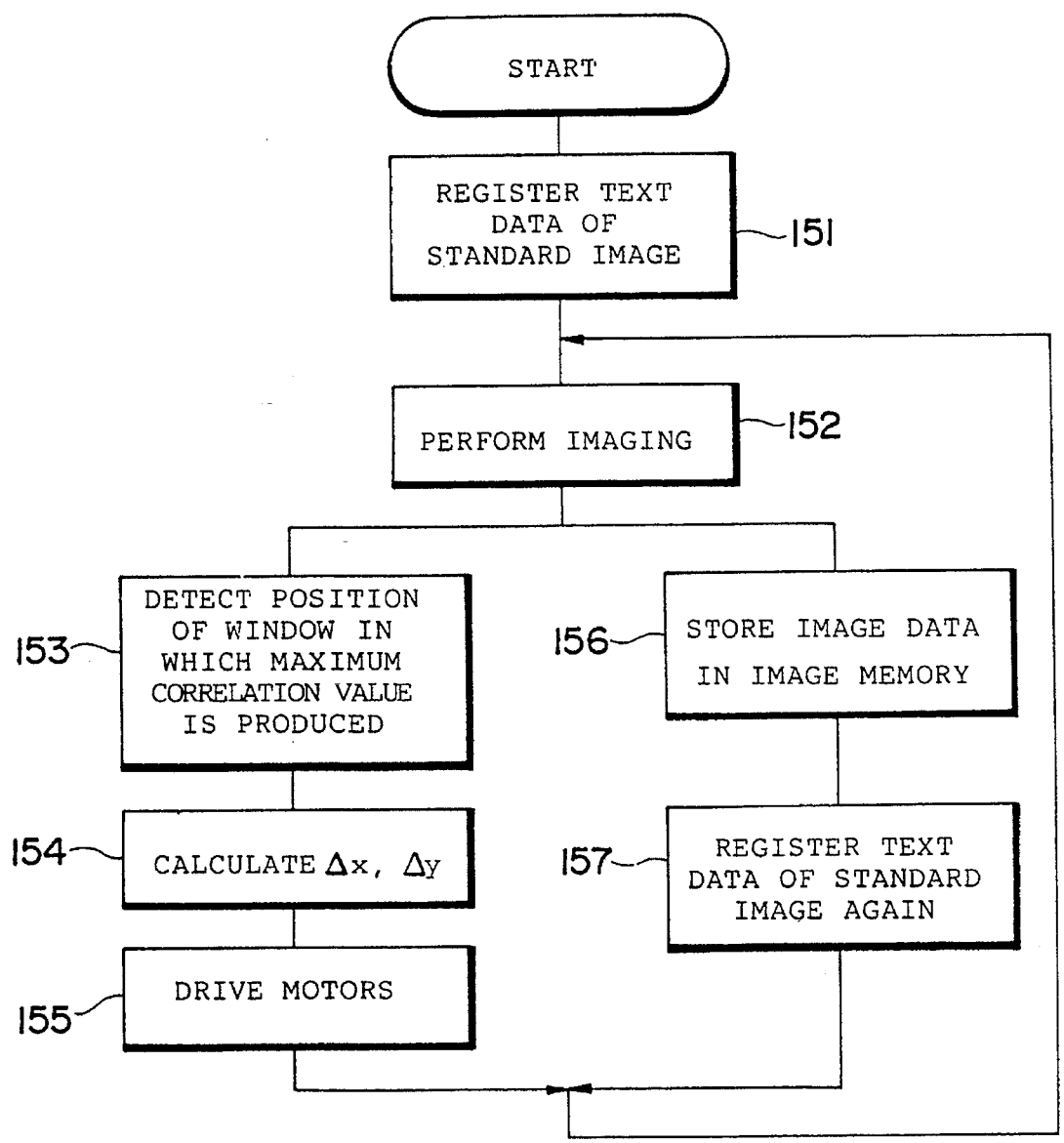
FIG. 30 is a flowchart illustrating a flowchart of process for updating a text pattern.

The system configuration shown in FIG. 28 is utilized as is. FIG. 30 illustrates the flow of the overall operation of the system.

The initial image of the subject Su is sensed by the camera 9, text data is created with the image of the subject serving as the standard image, and the text data is registered in a memory or text-data register of the correlation-value calculating unit 10C. Further, the positional coordinates $(x_0, y_0)$ of the window containing the image of the subject are applied to the control circuit 124 (step 151).

The subject Su that has started to move is photographed again (step 152), coordinates $(x_1, y_1)$ of the window giving the maximum value of the correlation values are found based upon the image data, and these coordinates are applied from the unit 10C to the control circuit 124. Concurrently, the image data obtained by photography is temporarily stored in the image memory of the unit 10C (step 156). Partial image data within the window giving the maximum value of the correlation values is extracted from the image data, text data is created again based upon this partial data, and the text data registered previously is replaced by the text data newly created, whereby the text data is updated (step 157). Since the text data is thus updated, the latest text data is always preserved even if the attitude of the subject Su changes so that there is a change in the image thereof. This makes it possible to follow up a change in the attitude of the subject Su.

The amount of displacement $\Delta x$, $\Delta y$ of the subject Su is calculated by the control circuit 124 (step 154), and control of the attitude of camera 9 is performed based upon the amount of displacement in such a manner that the image of the subject will fall within the window of position $(x_0, y_0)$ at all times (step 155).

The processing of steps 152–157 is repeated at the period of the vertical scanning interval V.

Industrial Applicability

The image processor is capable of being utilized not only in the inspection apparatus for scratches and stains, the positioning apparatus and the automatic tracking system illustrated in the examples of application but also in an apparatus for recognizing objects, etc.

What is claimed is:

1. An image processor, comprising:

pseudo-gray-scale image generating circuit means for converting input image data, which is represented by a first prescribed number of bits per pixel, into pseudo-gray-scale image data represented by a second prescribed number of bits, which is less than said first prescribed number of bits;

image restoration circuit means for restoring the pseudo-gray-scale image data for each and every one of a plurality of small areas, each of which comprises a plurality of pixels and is provided in a window that scans the pseudo-gray-scale image generated by said pseudo-gray-scale image generating circuit means, with said each small area serving as one restored pixel, and outputting restored image data for a window at each and every position; and similarity operating circuit means for calculating an index value representing a degree of similarity by comparing the restored image data of each window sequentially outputted by the image restoration circuit means and reference data representing a standard image.

2. An image processor according to claim 1, wherein said pseudo-gray-scale image generating circuit means binarizes the input image data using an error diffusion method and generates dither image data represented by one bit per pixel.

3. An image processor according to claim 1, wherein said pseudo-gray-scale image generating circuit means subjects the input image data to a four-value conversion using an error diffusion method and generates pseudo-gray-scale image data represented by two bits per pixel.

4. An image processor according to claim 1, further comprising peak holding circuit means for detecting an index value, which represents the highest degree of similarity, from among similarity index values regarding each of the windows obtained from said similarity operating circuit means, and position data indicative of the window in which this index value is generated.

5. An image processor according to claim 1, wherein the index value representing said degree of similarity is a difference value in lightness of the image, and said similarity operating circuit means calculates an absolute value of a difference between restored image data and corresponding reference data for each and every small area, sums the absolute values of these differences over all small areas contained in one window and outputs the sum value as a difference value of lightness.

6. An image processor according to claim 1, further comprising peak holding circuit means for detecting a smallest difference value from among difference values of lightness regarding each of the windows obtained by said similarity operating circuit means, as well as position data indicative of the window in which the smallest difference value is produced.

7. An image processor according to claim 1, wherein said similarity operating circuit means calculates a cross-correlation value between restored image data and reference data for each and every window, and outputs this cross-correlation value as the index value representing degree of similarity.

8. An image processor according to claim 7, further comprising peak holding circuit means for detecting a largest cross-correlation value from among the cross-correlation values regarding each of the windows obtained by said similarity operating circuit means, as well as position data indicative of the window in which the largest cross-correlation value is produced.

9. An image processor according to claim 1, wherein said image restoration circuit means includes:

cascade-connected line memories, the number of which corresponds to the number of pixels in the vertical direction of said window, for transferring pseudo-gray-scale image data having the second prescribed number of bits;

a circuit for extracting, from each of the line memories, and for each and every small area, pseudo-gray-scale image data of a number of pixels in the horizontal direction of the window; and adder circuit means for summing the extracted pseudo-gray-scale image data for each and every small area and outputting restored image data.

10. An image processor according to claim 9, further comprising smoothing circuit means for smoothing the restored image data, which is outputted by said adder circuit means, over restored pixels before and behind the restored image data.

11. An image processor comprising:

A/D converter circuit means for converting a video signal, which represents an image of a subject and is provided by a video camera, into input image data pixel by pixel, wherein the input image data is represented by a first prescribed number of bits per pixel;

pseudo-gray-scale image generating circuit means for converting the input image data, which is outputted by said A/D converter circuit means, into pseudo-gray-scale image data represented by a second prescribed number of bits, which is less than said first prescribed number of bits; and image restoration circuit means for restoring the pseudo-gray-scale image data for each and every one of a plurality of small areas, each of which comprises a plurality of pixels and is provided in a window that scans the pseudo-gray-scale image generated by said pseudo-gray-scale image generating circuit means, with said each small area serving as one restored pixel, and outputting restored image data for a window at each and every position.

12. An image processor according to claim 11, wherein said pseudo-gray-scale image generating circuit means binarizes the input image data using an error diffusion method and generates dither image data represented by one bit per pixel.

13. An image processor according to claim 11, wherein said pseudo-gray-scale image generating circuit means subjects the input image data to a four-value conversion using an error diffusion method and generates pseudo-gray-scale image data represented by two bits per pixel.

14. An image processor according to claim 11, wherein said image restoration circuit means includes:

cascade-connected line memories, the number of which corresponds to the number of pixels in the vertical direction of said window, for transferring pseudo-gray-scale image data having the second prescribed number of bits;

a circuit for extracting, from each of the line memories, and for each and every small area, pseudo-gray-scale image data of a number of pixels in the horizontal direction of the window; and adder circuit means for summing the extracted pseudo-gray-scale image data for each and every small area and outputting restored image data.

15. An image processor according to claim 14, further comprising smoothing circuit means for smoothing the restored image data, which is outputted by said adder circuit means, over restored pixels before and behind the restored image data.

16. An image processing method, comprising the steps of:

converting input image data, which is represented by a first prescribed number of bits per pixel, into pseudo-gray-scale image data represented by a second prescribed number of bits, which is less than the first prescribed number of bits;

generating restored image data by summing said pseudo-gray-scale image data for each and every one of a plurality of small areas, each of which comprises a plurality of pixels and is provided in a window that scans the pseudo-gray-scale image generated, thereby restoring the image data for a window at each and every position; and comparing the restored image data with reference data representing a standard image by calculating an index value representing a degree of similarity between the restored image data of each window and the reference data.

17. An image processing method according to claim 16, wherein said step of converting input image data includes binarizing the input image data using an error diffusion method and generating dither image data represented by one bit per pixel.

18. An image processing method according to claim 16, wherein said step of converting input image data includes subjecting the input image data to a four-value conversion using an error diffusion method and generating pseudo-gray-scale image data represented by two bits per pixel.

19. An image processing method according to claim 16, further comprising a step of detecting an index value, which represents the highest degree of similarity, from among similarity index values regarding each of the windows, and position data indicative of the window in which this index value is generated.

20. An image processing method according to claim 16, wherein the index value representing said degree of similarity is a difference value in lightness of the image, an absolute value of a difference between restored image data and corresponding reference data is calculated for each and every small area, the absolute values of these differences are summed over all small areas contained in one window, and the sum value is outputted as a difference value of lightness.

21. An image processing method according to claim 20, further comprising a step of detecting a smallest difference value from among difference values of lightness regarding each of the windows obtained, as well as position data indicative of the window in which the smallest difference value is produced.

22. An image processing method according to claim 16, wherein, in calculation of the similarity index value, a cross-correlation value between restored image data and reference data is calculated for each and every window, and this cross-correlation value is adopted as the index value representing degree of similarity.

23. An image processing method according to claim 22, further comprising a step of detecting a largest cross-correlation value from among the cross-correlation values regarding each of the windows, as well as position data indicative of the window in which the largest cross-correlation value is produced.

24. An image processing method according to claim 16, wherein line memories, the number of which corresponds to the number of pixels in the vertical direction of said window, for transferring pseudo-gray-scale image data having the second prescribed number of bits are connected in cascade;

pseudo-gray-scale image data of a number of pixels in the horizontal direction of the window is extracted, for each and every small area, from each of the line memories; and the extracted pseudo-gray-scale image data is summed for each and every small area to thereby restore the image data.

25. An image processing method according to claim 24, further comprising a step of smoothing the restored image data over restored pixels before and behind the restored image data.

26. An image processing method comprising the steps of:

converting a video signal, which represents an image of a subject and is provided by a video camera, into input image data pixel by pixel, wherein the input image data is represented by a first prescribed number of bits per pixel;

converting the input image data into pseudo-gray-scale image data represented by a second prescribed number of bits, which is less than said first prescribed number of bits; and summing said pseudo-gray-scale image data for each and every one of a plurality of small areas, each of which comprises a plurality of pixels and is provided in a window that scans the pseudo-gray-scale image, thereby restoring the image data for a window at each and every position, with said each small area serving as one restored pixel.

27. An inspection apparatus for scratches or the like, comprising:

image sensing means for imaging a subject and outputting a video signal representing the image of the subject;

an A/D converter circuit for converting the video signal, which is outputted by said image sensing means, into input image data;

deviation value calculating means for calculating a deviation value regarding lightness, or density of a specific color, in the input image data outputted by said A/D converter circuit;

means for determining whether the deviation value obtained by said deviation value calculating means is greater than a predetermined threshold;

pseudo-gray-scale image generating circuit means for converting said input image data, which is represented by a first prescribed number of bits per pixel, into pseudo-gray-scale image data represented by a second prescribed number of bits, which is less than said first prescribed number of bits; and image restoration circuit means for restoring the pseudo-gray-scale image data for each and every one of a plurality of small areas, each of which comprises a plurality of pixels and is provided in a window that scans the pseudo-gray-scale image generated by said pseudo-gray-scale image generating circuit means, with said each small area serving as one restored pixel, and outputting restored image data for a window at each and every position;

said deviation value calculating means calculating a deviation value for each and every window with regard to said image data, and detecting a maximum value from among these deviation values;

said determining means comparing the maximum deviation value with a predetermined threshold value.

* * * * *